(12) United States Patent
Harley et al.

(10) Patent No.: US 9,519,361 B2
(45) Date of Patent: Dec. 13, 2016

(54) ACTIVE STYLUS

(71) Applicant: Apple Inc., Cupertino, CA (US)

(72) Inventors: Jonah A. Harley, Los Gatos, CA (US); David I. Simon, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/578,051

(22) Filed: Dec. 19, 2014

(65) Prior Publication Data

US 2015/0103049 A1 Apr. 16, 2015

Related U.S. Application Data

(63) Continuation of application No. 13/166,726, filed on Jun. 22, 2011, now Pat. No. 8,928,635.

(51) Int. Cl.
| G06F 3/045 | (2006.01) |
| G06F 3/0354 | (2013.01) |
| G06F 3/044 | (2006.01) |
| G06F 3/038 | (2013.01) |

(52) U.S. Cl.
CPC ......... G06F 3/03545 (2013.01); G06F 3/0383 (2013.01); G06F 3/044 (2013.01); G06F 2203/04112 (2013.01)

(58) Field of Classification Search
CPC .... G06F 3/033; G06F 3/03545; G06F 3/0383; G06F 3/044
See application file for complete search history.

(56) References Cited

U.S. PATENT DOCUMENTS

| 3,462,692 A | 8/1969 | Bartlett |
| 3,970,846 A | 7/1976 | Schofield et al. |
| 4,220,815 A | 9/1980 | Gibson et al. |
| 4,281,407 A | 7/1981 | Tosima |
| 4,289,927 A | 9/1981 | Rodgers |
| 4,320,292 A | 3/1982 | Oikawa et al. |
| 4,334,219 A | 6/1982 | Paülus et al. |
| 4,345,248 A | 8/1982 | Togashi et al. |
| 4,405,921 A | 9/1983 | Mukaiyama |
| 4,439,855 A | 3/1984 | Dholakia |
| 4,476,463 A | 10/1984 | Ng et al. |
| 4,481,510 A | 11/1984 | Hareng et al. |
| 4,484,179 A | 11/1984 | Kasday |
| 4,490,607 A | 12/1984 | Pease et al. |
| 4,496,981 A | 1/1985 | Ota |

(Continued)

FOREIGN PATENT DOCUMENTS

| CN | 1243282 A | 2/2000 |
| CN | 1278348 A | 12/2000 |

(Continued)

OTHER PUBLICATIONS

Final Office Action mailed May 4, 2015, for U.S. Appl. No. 13/166,699, filed Jun. 22, 2011, 17 pages.

(Continued)

*Primary Examiner* — Joe H Cheng
(74) *Attorney, Agent, or Firm* — Morrison & Foerster LLP

(57) ABSTRACT

An active stylus is disclosed. The stylus includes an electrode at a tip of the stylus; and powered circuitry coupled to the electrode and configured for capacitively coupling the electrode with a capacitive touch sensor panel. The powered circuitry can further include drive circuitry configured to output a drive voltage at the electrode and/or sense circuitry configured to sense a voltage received at the electrode.

21 Claims, 7 Drawing Sheets

(56) References Cited

U.S. PATENT DOCUMENTS

| | | |
|---|---|---|
| 4,520,357 A | 5/1985 | Castleberry et al. |
| 4,542,375 A | 9/1985 | Alles et al. |
| 4,602,321 A | 7/1986 | Bornhorst |
| 4,603,356 A | 7/1986 | Bates |
| 4,642,459 A | 2/1987 | Caswell et al. |
| 4,644,338 A | 2/1987 | Aoki et al. |
| 4,655,552 A | 4/1987 | Togashi et al. |
| 4,662,718 A | 5/1987 | Masubuchi |
| 4,671,671 A | 6/1987 | Suetaka |
| 4,677,428 A | 6/1987 | Bartholow |
| 4,679,909 A | 7/1987 | Hamada et al. |
| 4,684,939 A | 8/1987 | Streit |
| 4,698,460 A | 10/1987 | Krein et al. |
| 4,705,942 A | 11/1987 | Budrikis et al. |
| 4,720,869 A | 1/1988 | Wadia |
| 4,736,203 A | 4/1988 | Sidlauskas |
| 4,740,782 A | 4/1988 | Aoki et al. |
| 4,749,879 A | 6/1988 | Peterson et al. |
| 4,759,610 A | 7/1988 | Yanagisawa |
| 4,767,192 A | 8/1988 | Chang et al. |
| 4,772,101 A | 9/1988 | Liu |
| 4,782,327 A | 11/1988 | Kley et al. |
| 4,782,328 A | 11/1988 | Denlinger |
| 4,785,564 A | 11/1988 | Gurtler |
| 4,794,634 A | 12/1988 | Torihata et al. |
| 4,814,760 A | 3/1989 | Johnston et al. |
| 4,823,178 A | 4/1989 | Suda |
| 4,838,655 A | 6/1989 | Hunahata et al. |
| 4,846,559 A | 7/1989 | Kniffler |
| 4,877,697 A | 10/1989 | Vollmann et al. |
| 4,893,120 A | 1/1990 | Doering et al. |
| 4,904,056 A | 2/1990 | Castleberry |
| 4,917,474 A | 4/1990 | Yamazaki et al. |
| 4,940,901 A | 7/1990 | Henry et al. |
| 5,003,356 A | 3/1991 | Wakai et al. |
| 5,037,119 A | 8/1991 | Takehara et al. |
| 5,039,206 A | 8/1991 | Wiltshire |
| 5,051,570 A | 9/1991 | Tsujikawa et al. |
| 5,063,379 A | 11/1991 | Fabry et al. |
| 5,083,175 A | 1/1992 | Hack et al. |
| 5,105,186 A | 4/1992 | May |
| 5,113,041 A | 5/1992 | Blonder et al. |
| 5,117,071 A | 5/1992 | Greanias et al. |
| 5,140,153 A | 8/1992 | Heikkinen et al. |
| 5,151,688 A | 9/1992 | Tanaka et al. |
| 5,153,420 A | 10/1992 | Hack et al. |
| 5,172,104 A | 12/1992 | Tanigaki et al. |
| 5,182,661 A | 1/1993 | Ikeda et al. |
| 5,204,661 A | 4/1993 | Hack et al. |
| 5,236,850 A | 8/1993 | Zhang |
| 5,237,314 A | 8/1993 | Knapp |
| 5,239,152 A | 8/1993 | Caldwell et al. |
| 5,243,332 A | 9/1993 | Jacobson |
| 5,276,538 A | 1/1994 | Monji et al. |
| 5,301,048 A | 4/1994 | Huisman |
| 5,308,964 A | 5/1994 | Kwon |
| 5,339,090 A | 8/1994 | Crossland et al. |
| 5,339,091 A | 8/1994 | Yamazaki et al. |
| 5,341,133 A | 8/1994 | Savoy et al. |
| 5,349,174 A | 9/1994 | Van Berkel et al. |
| 5,360,426 A | 11/1994 | Muller et al. |
| 5,365,461 A | 11/1994 | Stein et al. |
| 5,369,262 A | 11/1994 | Dvorkis et al. |
| 5,376,948 A | 12/1994 | Roberts |
| 5,381,251 A | 1/1995 | Nonomura et al. |
| 5,386,543 A | 1/1995 | Bird |
| 5,387,445 A | 2/1995 | Horiuchi et al. |
| 5,414,283 A | 5/1995 | den Boer et al. |
| 5,422,693 A | 6/1995 | Vogeley et al. |
| 5,430,462 A | 7/1995 | Katagiri et al. |
| 5,445,871 A | 8/1995 | Murase et al. |
| 5,446,564 A | 8/1995 | Mawatari et al. |
| 5,461,400 A | 10/1995 | Ishii et al. |
| 5,475,398 A | 12/1995 | Yamazaki et al. |
| 5,483,261 A | 1/1996 | Yasutake |
| 5,483,263 A | 1/1996 | Bird et al. |
| 5,485,177 A | 1/1996 | Shannon et al. |
| 5,488,204 A | 1/1996 | Mead et al. |
| 5,502,514 A | 3/1996 | Vogeley et al. |
| 5,510,916 A | 4/1996 | Takahashi |
| 5,515,186 A | 5/1996 | Fergason et al. |
| 5,525,813 A | 6/1996 | Miyake et al. |
| 5,532,743 A | 7/1996 | Komobuchi |
| 5,559,471 A | 9/1996 | Black |
| 5,568,292 A | 10/1996 | Kim |
| 5,581,378 A | 12/1996 | Kulick et al. |
| 5,585,817 A | 12/1996 | Itoh et al. |
| 5,589,961 A | 12/1996 | Shigeta et al. |
| 5,598,004 A | 1/1997 | Powell et al. |
| 5,608,390 A | 3/1997 | Gasparik |
| 5,610,629 A | 3/1997 | Baur |
| 5,635,982 A | 6/1997 | Zhang et al. |
| 5,637,187 A | 6/1997 | Takasu et al. |
| 5,652,600 A | 7/1997 | Khormaei et al. |
| 5,659,332 A | 8/1997 | Ishii et al. |
| 5,677,744 A | 10/1997 | Yoneda et al. |
| 5,709,118 A | 1/1998 | Ohkubo |
| 5,712,528 A | 1/1998 | Barrow et al. |
| 5,734,491 A | 3/1998 | Debesis |
| 5,736,980 A | 4/1998 | Iguchi et al. |
| 5,751,453 A | 5/1998 | Baur |
| 5,757,522 A | 5/1998 | Kulick et al. |
| 5,767,623 A | 6/1998 | Friedman et al. |
| 5,777,713 A | 7/1998 | Kimura |
| 5,778,108 A | 7/1998 | Coleman, Jr. |
| 5,790,106 A | 8/1998 | Hirano et al. |
| 5,793,342 A | 8/1998 | Rhoads |
| 5,796,121 A | 8/1998 | Gates |
| 5,796,473 A | 8/1998 | Murata et al. |
| 5,812,109 A | 9/1998 | Kaifu et al. |
| 5,818,037 A | 10/1998 | Redford et al. |
| 5,818,553 A | 10/1998 | Koenck et al. |
| 5,818,956 A | 10/1998 | Tuli |
| 5,825,352 A | 10/1998 | Bisset et al. |
| 5,831,693 A | 11/1998 | McCartney, Jr. et al. |
| 5,834,765 A | 11/1998 | Ashdown |
| 5,835,079 A | 11/1998 | Shieh |
| 5,838,290 A | 11/1998 | Kuijk |
| 5,838,308 A | 11/1998 | Knapp et al. |
| 5,852,487 A | 12/1998 | Fujimori et al. |
| 5,854,448 A | 12/1998 | Nozaki et al. |
| 5,854,881 A | 12/1998 | Yoshida et al. |
| 5,877,735 A | 3/1999 | King et al. |
| 5,880,411 A | 3/1999 | Gillespie et al. |
| 5,883,715 A | 3/1999 | Steinlechner et al. |
| 5,890,799 A | 4/1999 | Yiu et al. |
| 5,917,464 A | 6/1999 | Stearns |
| 5,920,309 A | 7/1999 | Bisset et al. |
| 5,920,360 A | 7/1999 | Coleman, Jr. |
| 5,923,320 A | 7/1999 | Murakami et al. |
| 5,926,238 A | 7/1999 | Inoue et al. |
| 5,930,591 A | 7/1999 | Huang |
| 5,940,049 A | 8/1999 | Hinman et al. |
| 5,942,761 A | 8/1999 | Tuli |
| 5,956,020 A | 9/1999 | D'Amico et al. |
| 5,959,617 A | 9/1999 | Bird et al. |
| 5,959,697 A | 9/1999 | Coleman, Jr. |
| 5,962,856 A | 10/1999 | Zhao et al. |
| 5,966,108 A | 10/1999 | Ditzik |
| 5,973,312 A | 10/1999 | Curling et al. |
| 5,990,980 A | 11/1999 | Golin |
| 5,990,988 A | 11/1999 | Hanihara et al. |
| 5,995,172 A | 11/1999 | Ikeda et al. |
| 6,002,387 A | 12/1999 | Ronkka et al. |
| 6,020,590 A | 2/2000 | Aggas et al. |
| 6,020,945 A | 2/2000 | Sawai et al. |
| 6,023,307 A | 2/2000 | Park |
| 6,028,581 A | 2/2000 | Umeya |
| 6,049,428 A | 4/2000 | Khan et al. |
| 6,061,177 A | 5/2000 | Fujimoto |
| 6,067,062 A | 5/2000 | Takasu et al. |
| 6,067,140 A | 5/2000 | Woo et al. |
| 6,069,393 A | 5/2000 | Hatanaka et al. |
| 6,078,378 A | 6/2000 | Lu et al. |

(56) References Cited

U.S. PATENT DOCUMENTS

| | | |
|---|---|---|
| 6,087,599 A | 7/2000 | Knowles |
| 6,091,030 A | 7/2000 | Tagawa et al. |
| 6,100,538 A | 8/2000 | Ogawa |
| 6,118,435 A | 9/2000 | Fujita et al. |
| 6,133,906 A | 10/2000 | Geaghan |
| 6,163,313 A | 12/2000 | Aroyan et al. |
| 6,177,302 B1 | 1/2001 | Yamazaki et al. |
| 6,181,394 B1 | 1/2001 | Sanelle et al. |
| 6,182,892 B1 | 2/2001 | Angelo et al. |
| 6,184,863 B1 | 2/2001 | Sibert et al. |
| 6,184,873 B1 | 2/2001 | Ward |
| 6,188,391 B1 | 2/2001 | Seely et al. |
| 6,188,781 B1 | 2/2001 | Brownlee |
| 6,232,607 B1 | 5/2001 | Huang |
| 6,236,053 B1 | 5/2001 | Shariv |
| 6,236,063 B1 | 5/2001 | Yamazaki et al. |
| 6,239,788 B1 | 5/2001 | Nohno et al. |
| 6,242,729 B1 | 6/2001 | Izumi et al. |
| 6,262,408 B1 | 7/2001 | Izumi et al. |
| 6,265,792 B1 | 7/2001 | Granchukoff |
| 6,271,813 B1 | 8/2001 | Palalau |
| 6,278,423 B1 | 8/2001 | Wald et al. |
| 6,278,444 B1 | 8/2001 | Wilson et al. |
| 6,284,558 B1 | 9/2001 | Sakamoto |
| 6,295,113 B1 | 9/2001 | Yang |
| 6,300,977 B1 | 10/2001 | Waechter |
| 6,310,610 B1 | 10/2001 | Beaton et al. |
| 6,316,790 B1 | 11/2001 | Kodaira et al. |
| 6,320,617 B1 | 11/2001 | Gee et al. |
| 6,323,490 B1 | 11/2001 | Ikeda et al. |
| 6,323,846 B1 | 11/2001 | Westerman et al. |
| 6,326,956 B1 | 12/2001 | Jaeger et al. |
| 6,327,376 B1 | 12/2001 | Harkin |
| 6,333,544 B1 | 12/2001 | Toyoda et al. |
| 6,351,076 B1 | 2/2002 | Yoshida et al. |
| 6,351,260 B1 | 2/2002 | Graham et al. |
| 6,357,939 B1 | 3/2002 | Baron |
| 6,364,829 B1 | 4/2002 | Fulghum |
| 6,377,249 B1 | 4/2002 | Mumford |
| 6,380,995 B1 | 4/2002 | Kim |
| 6,392,254 B1 | 5/2002 | Liu et al. |
| 6,399,166 B1 | 6/2002 | Khan et al. |
| 6,400,359 B1 | 6/2002 | Katabami |
| 6,441,362 B1 | 8/2002 | Ogawa |
| 6,453,008 B1 | 9/2002 | Sakaguchi et al. |
| 6,462,328 B2 | 10/2002 | Toyoda |
| 6,465,824 B1 | 10/2002 | Kwasnick et al. |
| 6,476,447 B1 | 11/2002 | Yamazaki et al. |
| 6,489,631 B2 | 12/2002 | Young et al. |
| 6,495,387 B2 | 12/2002 | French |
| 6,504,530 B1 | 1/2003 | Wilson et al. |
| 6,518,561 B1 | 2/2003 | Miura |
| 6,521,109 B1 | 2/2003 | Bartic et al. |
| 6,529,189 B1 | 3/2003 | Colgan et al. |
| 6,552,745 B1 | 4/2003 | Perner |
| 6,597,348 B1 | 7/2003 | Yamazaki et al. |
| 6,603,867 B1 | 8/2003 | Sugino et al. |
| 6,646,636 B1 | 11/2003 | Popovich et al. |
| 6,667,740 B2 | 12/2003 | Ely et al. |
| 6,679,702 B1 | 1/2004 | Rau |
| 6,681,034 B1 | 1/2004 | Russo |
| 6,690,156 B1 | 2/2004 | Weiner et al. |
| 6,690,387 B2 | 2/2004 | Zimmerman et al. |
| 6,700,144 B2 | 3/2004 | Shimazaki et al. |
| 6,720,594 B2 | 4/2004 | Rahn et al. |
| 6,738,031 B2 | 5/2004 | Young et al. |
| 6,738,050 B2 | 5/2004 | Comiskey et al. |
| 6,741,655 B1 | 5/2004 | Chang et al. |
| 6,762,741 B2 | 7/2004 | Weindorf |
| 6,762,752 B2 | 7/2004 | Perski et al. |
| 6,803,906 B1 | 10/2004 | Morrison et al. |
| 6,815,716 B2 | 11/2004 | Sanson et al. |
| 6,831,710 B2 | 12/2004 | den Boer |
| 6,862,022 B2 | 3/2005 | Slupe |
| 6,864,882 B2 | 3/2005 | Newton |
| 6,879,344 B1 | 4/2005 | Nakamura et al. |
| 6,879,710 B1 | 4/2005 | Hinoue et al. |
| 6,888,528 B2 | 5/2005 | Rai et al. |
| 6,947,017 B1 | 9/2005 | Gettemy |
| 6,947,102 B2 | 9/2005 | den Boer et al. |
| 6,956,564 B1 | 10/2005 | Williams |
| 6,972,753 B1 | 12/2005 | Kimura et al. |
| 6,995,743 B2 | 2/2006 | den Boer et al. |
| 7,006,080 B2 | 2/2006 | Gettemy |
| 7,009,663 B2 | 3/2006 | Abileah et al. |
| 7,015,894 B2 | 3/2006 | Morohoshi |
| 7,023,503 B2 | 4/2006 | den Boer |
| 7,053,967 B2 | 5/2006 | Abileah et al. |
| 7,068,254 B2 | 6/2006 | Yamazaki et al. |
| 7,075,521 B2 | 7/2006 | Yamamoto et al. |
| 7,098,894 B2 | 8/2006 | Yang et al. |
| 7,109,465 B2 | 9/2006 | Kok et al. |
| 7,157,649 B2 | 1/2007 | Hill |
| 7,164,164 B2 | 1/2007 | Nakamura et al. |
| 7,176,905 B2 | 2/2007 | Baharav et al. |
| 7,177,026 B2 | 2/2007 | Perlin |
| 7,184,009 B2 | 2/2007 | Bergquist |
| 7,184,064 B2 | 2/2007 | Zimmerman et al. |
| 7,190,461 B2 | 3/2007 | Han et al. |
| 7,205,988 B2 | 4/2007 | Nakamura et al. |
| 7,208,102 B2 | 4/2007 | Aoki et al. |
| 7,242,049 B2 | 7/2007 | Forbes et al. |
| 7,250,596 B2 | 7/2007 | Reime |
| 7,292,229 B2 | 11/2007 | Morag et al. |
| 7,298,367 B2 | 11/2007 | Geaghan et al. |
| 7,348,946 B2 | 3/2008 | Booth, Jr. et al. |
| 7,372,455 B2 | 5/2008 | Perski et al. |
| 7,408,598 B2 | 8/2008 | den Boer et al. |
| 7,418,117 B2 | 8/2008 | Kim et al. |
| 7,450,105 B2 | 11/2008 | Nakamura et al. |
| 7,456,812 B2 | 11/2008 | Smith et al. |
| 7,463,297 B2 | 12/2008 | Yoshida et al. |
| 7,483,005 B2 | 1/2009 | Nakamura et al. |
| 7,522,149 B2 | 4/2009 | Nakamura et al. |
| 7,535,468 B2 | 5/2009 | Uy |
| 7,536,557 B2 | 5/2009 | Murakami et al. |
| 7,545,371 B2 | 6/2009 | Nakamura et al. |
| 7,598,949 B2 | 10/2009 | Han |
| 7,609,862 B2 | 10/2009 | Black |
| 7,612,767 B1 | 11/2009 | Griffin et al. |
| 7,629,945 B2 | 12/2009 | Baudisch |
| 7,649,524 B2 | 1/2010 | Haim et al. |
| 7,649,527 B2 | 1/2010 | Cho et al. |
| 7,663,607 B2 | 2/2010 | Hotelling et al. |
| 7,719,515 B2 | 5/2010 | Fujiwara et al. |
| 7,786,978 B2 | 8/2010 | Lapstun et al. |
| 7,843,439 B2 | 11/2010 | Perski et al. |
| 7,848,825 B2 | 12/2010 | Wilson et al. |
| 7,859,519 B2 | 12/2010 | Tulbert |
| 7,868,873 B2 | 1/2011 | Palay et al. |
| 7,902,840 B2 | 3/2011 | Zachut et al. |
| 7,924,272 B2 | 4/2011 | den Boer et al. |
| 8,031,094 B2 | 10/2011 | Hotelling et al. |
| 8,059,102 B2 | 11/2011 | Rimon et al. |
| 8,094,128 B2 | 1/2012 | Vu et al. |
| 8,169,421 B2 | 5/2012 | Wright et al. |
| 8,174,273 B2 | 5/2012 | Geaghan |
| 8,228,311 B2 | 7/2012 | Perski et al. |
| 8,232,977 B2 | 7/2012 | Zachut et al. |
| 8,269,511 B2 | 9/2012 | Jordan |
| 8,278,571 B2 | 10/2012 | Orsley |
| 8,373,677 B2 | 2/2013 | Perski et al. |
| 8,390,588 B2 | 3/2013 | Vu et al. |
| 8,400,427 B2 | 3/2013 | Perski et al. |
| 8,479,122 B2 | 7/2013 | Hotelling et al. |
| 8,481,872 B2 | 7/2013 | Zachut |
| 8,493,331 B2 | 7/2013 | Krah et al. |
| 8,536,471 B2 | 9/2013 | Stern et al. |
| 8,537,126 B2 | 9/2013 | Yousefpor et al. |
| 8,552,986 B2 | 10/2013 | Wong et al. |
| 8,581,870 B2 | 11/2013 | Bokma et al. |
| 8,605,045 B2 | 12/2013 | Mamba et al. |
| 8,659,556 B2 | 2/2014 | Wilson |
| 8,698,769 B2 | 4/2014 | Coulson et al. |

(56) References Cited

U.S. PATENT DOCUMENTS

| | | |
|---|---|---|
| 8,723,825 B2 | 5/2014 | Wright et al. |
| 8,816,985 B1 | 8/2014 | Tate et al. |
| 8,847,899 B2 | 9/2014 | Washburn et al. |
| 8,928,635 B2 | 1/2015 | Harley et al. |
| 8,933,899 B2 | 1/2015 | Shahparnia et al. |
| 9,013,429 B1 | 4/2015 | Krekhovetskyy et al. |
| 9,092,086 B2 | 7/2015 | Krah et al. |
| 9,146,414 B2 | 9/2015 | Chang et al. |
| 9,170,681 B2 | 10/2015 | Huang et al. |
| 9,310,923 B2 | 4/2016 | Krah et al. |
| 9,329,703 B2 | 5/2016 | Falkenburg et al. |
| 2001/0000026 A1 | 3/2001 | Skoog |
| 2001/0000676 A1 | 5/2001 | Zhang et al. |
| 2001/0003711 A1 | 6/2001 | Coyer |
| 2001/0044858 A1 | 11/2001 | Rekimoto |
| 2001/0046013 A1 | 11/2001 | Noritake et al. |
| 2001/0052597 A1 | 12/2001 | Young et al. |
| 2001/0055008 A1 | 12/2001 | Young et al. |
| 2002/0027164 A1 | 3/2002 | Mault et al. |
| 2002/0030581 A1 | 3/2002 | Janiak et al. |
| 2002/0030768 A1 | 3/2002 | Wu |
| 2002/0052192 A1 | 5/2002 | Yamazaki et al. |
| 2002/0063518 A1 | 5/2002 | Okamoto et al. |
| 2002/0067845 A1 | 6/2002 | Griffis |
| 2002/0071074 A1 | 6/2002 | Noritake et al. |
| 2002/0074171 A1 | 6/2002 | Nakano et al. |
| 2002/0074549 A1 | 6/2002 | Park et al. |
| 2002/0080123 A1 | 6/2002 | Kennedy et al. |
| 2002/0080263 A1 | 6/2002 | Krymski |
| 2002/0126240 A1 | 9/2002 | Seiki et al. |
| 2002/0149571 A1 | 10/2002 | Roberts |
| 2002/0175903 A1 | 11/2002 | Fahraeus et al. |
| 2003/0020083 A1 | 1/2003 | Hsiung et al. |
| 2003/0038778 A1 | 2/2003 | Noguera |
| 2003/0103030 A1 | 6/2003 | Wu |
| 2003/0117369 A1 | 6/2003 | Spitzer et al. |
| 2003/0127672 A1 | 7/2003 | Rahn et al. |
| 2003/0137494 A1 | 7/2003 | Tulbert |
| 2003/0151569 A1 | 8/2003 | Lee et al. |
| 2003/0156087 A1 | 8/2003 | den Boer et al. |
| 2003/0156100 A1 | 8/2003 | Gettemy |
| 2003/0156230 A1 | 8/2003 | den Boer et al. |
| 2003/0174256 A1 | 9/2003 | Kim et al. |
| 2003/0174870 A1 | 9/2003 | Kim et al. |
| 2003/0179323 A1 | 9/2003 | Abileah et al. |
| 2003/0183019 A1 | 10/2003 | Chae |
| 2003/0197691 A1 | 10/2003 | Fujiwara et al. |
| 2003/0205662 A1 | 11/2003 | den Boer et al. |
| 2003/0218116 A1 | 11/2003 | den Boer et al. |
| 2003/0231277 A1 | 12/2003 | Zhang |
| 2003/0234759 A1 | 12/2003 | Bergquist |
| 2004/0008189 A1 | 1/2004 | Clapper et al. |
| 2004/0046900 A1 | 3/2004 | den Boer et al. |
| 2004/0095333 A1 | 5/2004 | Morag et al. |
| 2004/0113877 A1 | 6/2004 | Abileah et al. |
| 2004/0125430 A1 | 7/2004 | Kasajima et al. |
| 2004/0140962 A1 | 7/2004 | Wang et al. |
| 2004/0189587 A1 | 9/2004 | Jung et al. |
| 2004/0191976 A1 | 9/2004 | Udupa et al. |
| 2004/0252867 A1 | 12/2004 | Lan et al. |
| 2005/0040393 A1 | 2/2005 | Hong |
| 2005/0091297 A1 | 4/2005 | Sato et al. |
| 2005/0110777 A1 | 5/2005 | Geaghan et al. |
| 2005/0117079 A1 | 6/2005 | Pak et al. |
| 2005/0134749 A1 | 6/2005 | Abileah |
| 2005/0146517 A1 | 7/2005 | Robrecht et al. |
| 2005/0173703 A1 | 8/2005 | Lebrun |
| 2005/0179706 A1 | 8/2005 | Childers |
| 2005/0200603 A1 | 9/2005 | Casebolt et al. |
| 2005/0206764 A1 | 9/2005 | Kobayashi et al. |
| 2005/0231656 A1 | 10/2005 | den Boer et al. |
| 2005/0270590 A1 | 12/2005 | Izumi et al. |
| 2005/0275616 A1 | 12/2005 | Park et al. |
| 2005/0285985 A1 | 12/2005 | den Boer et al. |
| 2006/0007224 A1 | 1/2006 | Hayashi et al. |
| 2006/0007336 A1 | 1/2006 | Yamaguchi |
| 2006/0010658 A1 | 1/2006 | Bigley |
| 2006/0012580 A1 | 1/2006 | Perski et al. |
| 2006/0034492 A1 | 2/2006 | Siegel et al. |
| 2006/0120013 A1 | 6/2006 | Dioro et al. |
| 2006/0125971 A1 | 6/2006 | Abileah et al. |
| 2006/0170658 A1 | 8/2006 | Nakamura et al. |
| 2006/0176288 A1 | 8/2006 | Pittel et al. |
| 2006/0187367 A1 | 8/2006 | Abileah et al. |
| 2006/0197753 A1 | 9/2006 | Hotelling |
| 2006/0202975 A1 | 9/2006 | Chiang |
| 2006/0249763 A1 | 11/2006 | Mochizuki et al. |
| 2006/0250381 A1 | 11/2006 | Geaghan |
| 2006/0279690 A1 | 12/2006 | Yu et al. |
| 2007/0030258 A1 | 2/2007 | Pittel et al. |
| 2007/0062852 A1 | 3/2007 | Zachut et al. |
| 2007/0109239 A1 | 5/2007 | den Boer et al. |
| 2007/0109286 A1 | 5/2007 | Nakamura et al. |
| 2007/0131991 A1 | 6/2007 | Sugawa |
| 2007/0146349 A1 | 6/2007 | Errico et al. |
| 2007/0216905 A1 | 9/2007 | Han et al. |
| 2007/0279346 A1 | 12/2007 | den Boer et al. |
| 2007/0285405 A1 | 12/2007 | Rehm |
| 2007/0291012 A1 | 12/2007 | Chang |
| 2008/0012835 A1 | 1/2008 | Rimon et al. |
| 2008/0012838 A1 | 1/2008 | Rimon |
| 2008/0029691 A1 | 2/2008 | Han |
| 2008/0046425 A1 | 2/2008 | Perski |
| 2008/0048995 A1 | 2/2008 | Abileah et al. |
| 2008/0049153 A1 | 2/2008 | Abileah et al. |
| 2008/0049154 A1 | 2/2008 | Abileah et al. |
| 2008/0055295 A1 | 3/2008 | den Boer et al. |
| 2008/0055496 A1 | 3/2008 | Abileah et al. |
| 2008/0055497 A1 | 3/2008 | Abileah et al. |
| 2008/0055498 A1 | 3/2008 | Abileah et al. |
| 2008/0055499 A1 | 3/2008 | den Boer et al. |
| 2008/0055507 A1 | 3/2008 | den Boer et al. |
| 2008/0062156 A1 | 3/2008 | Abileah et al. |
| 2008/0062157 A1 | 3/2008 | Abileah et al. |
| 2008/0062343 A1 | 3/2008 | den Boer et al. |
| 2008/0066972 A1 | 3/2008 | Abileah et al. |
| 2008/0084374 A1 | 4/2008 | Abileah et al. |
| 2008/0111780 A1 | 5/2008 | Abileah et al. |
| 2008/0128180 A1 | 6/2008 | Perski et al. |
| 2008/0129909 A1 | 6/2008 | den Boer et al. |
| 2008/0129913 A1 | 6/2008 | den Boer et al. |
| 2008/0129914 A1 | 6/2008 | de Boer et al. |
| 2008/0142280 A1 | 6/2008 | Yamamoto et al. |
| 2008/0158165 A1 | 7/2008 | Geaghan et al. |
| 2008/0158172 A1 | 7/2008 | Hotelling et al. |
| 2008/0158180 A1 | 7/2008 | Krah et al. |
| 2008/0162997 A1 | 7/2008 | Vu et al. |
| 2008/0165311 A1 | 7/2008 | Abileah et al. |
| 2008/0170046 A1 | 7/2008 | Rimon et al. |
| 2008/0238885 A1 | 10/2008 | Zachut et al. |
| 2008/0278443 A1 | 11/2008 | Schelling et al. |
| 2008/0284925 A1 | 11/2008 | Han |
| 2008/0297487 A1 | 12/2008 | Hotelling et al. |
| 2008/0309625 A1 | 12/2008 | Krah et al. |
| 2008/0309628 A1 | 12/2008 | Krah et al. |
| 2008/0309631 A1 | 12/2008 | Westerman et al. |
| 2009/0009483 A1 | 1/2009 | Hotelling et al. |
| 2009/0027354 A1 | 1/2009 | Perski et al. |
| 2009/0065269 A1 | 3/2009 | Katsurahira |
| 2009/0066665 A1 | 3/2009 | Lee |
| 2009/0078476 A1 | 3/2009 | Rimon et al. |
| 2009/0095540 A1 | 4/2009 | Zachut et al. |
| 2009/0128529 A1 | 5/2009 | Izumi et al. |
| 2009/0135492 A1 | 5/2009 | Kusuda et al. |
| 2009/0153152 A1 | 6/2009 | Maharyta et al. |
| 2009/0153525 A1 | 6/2009 | Chang |
| 2009/0167728 A1 | 7/2009 | Geaghan et al. |
| 2009/0184939 A1 | 7/2009 | Wohlstadter et al. |
| 2009/0189867 A1 | 7/2009 | Krah et al. |
| 2009/0225210 A1 | 9/2009 | Sugawa |
| 2009/0251434 A1 | 10/2009 | Rimon et al. |
| 2009/0262637 A1 | 10/2009 | Badaye et al. |
| 2009/0273579 A1 | 11/2009 | Zachut et al. |
| 2009/0322685 A1 | 12/2009 | Lee |

(56) References Cited

U.S. PATENT DOCUMENTS

| | | |
|---|---|---|
| 2009/0322696 A1 | 12/2009 | Yaakoby et al. |
| 2010/0001978 A1 | 1/2010 | Lynch et al. |
| 2010/0006350 A1 | 1/2010 | Elias |
| 2010/0013793 A1 | 1/2010 | Abileah et al. |
| 2010/0013794 A1 | 1/2010 | Abileah et al. |
| 2010/0013796 A1 | 1/2010 | Abileah et al. |
| 2010/0020037 A1 | 1/2010 | Narita et al. |
| 2010/0020044 A1 | 1/2010 | Abileah et al. |
| 2010/0033766 A1 | 2/2010 | Marggraff |
| 2010/0045904 A1 | 2/2010 | Katoh et al. |
| 2010/0051356 A1 | 3/2010 | Stern et al. |
| 2010/0053113 A1 | 3/2010 | Wu |
| 2010/0059296 A9 | 3/2010 | Abileah et al. |
| 2010/0060590 A1 | 3/2010 | Wilson et al. |
| 2010/0066692 A1 | 3/2010 | Noguchi et al. |
| 2010/0066693 A1 | 3/2010 | Sato et al. |
| 2010/0073323 A1 | 3/2010 | Geaghan |
| 2010/0085325 A1 | 4/2010 | King-Smith et al. |
| 2010/0118237 A1 | 5/2010 | Katoh et al. |
| 2010/0155153 A1 | 6/2010 | Zachut |
| 2010/0194692 A1 | 8/2010 | Orr et al. |
| 2010/0252335 A1 | 10/2010 | Orsley |
| 2010/0271332 A1 | 10/2010 | Wu et al. |
| 2010/0289754 A1 | 11/2010 | Sleeman et al. |
| 2010/0302419 A1 | 12/2010 | den Boer et al. |
| 2010/0309171 A1 | 12/2010 | Hsieh et al. |
| 2010/0315384 A1 | 12/2010 | Hargreaves et al. |
| 2010/0315394 A1 | 12/2010 | Katoh et al. |
| 2010/0321320 A1 | 12/2010 | Hung et al. |
| 2010/0327882 A1 | 12/2010 | Shahparnia et al. |
| 2011/0001708 A1 | 1/2011 | Sleeman |
| 2011/0007029 A1 | 1/2011 | Ben-David |
| 2011/0043489 A1 | 2/2011 | Yoshimoto |
| 2011/0063993 A1 | 3/2011 | Wilson et al. |
| 2011/0084857 A1 | 4/2011 | Marino et al. |
| 2011/0084937 A1 | 4/2011 | Chang et al. |
| 2011/0090146 A1 | 4/2011 | Katsurahira |
| 2011/0090181 A1 | 4/2011 | Maridakis |
| 2011/0155479 A1 | 6/2011 | Oda et al. |
| 2011/0157068 A1 | 6/2011 | Parker et al. |
| 2011/0169771 A1 | 7/2011 | Fujioka et al. |
| 2011/0175834 A1 | 7/2011 | Han et al. |
| 2011/0216016 A1 | 9/2011 | Rosener |
| 2011/0216032 A1 | 9/2011 | Oda et al. |
| 2011/0254807 A1 | 10/2011 | Perski et al. |
| 2011/0273398 A1 | 11/2011 | Ho et al. |
| 2011/0304592 A1 | 12/2011 | Booth et al. |
| 2012/0013555 A1 | 1/2012 | Maeda et al. |
| 2012/0019488 A1 | 1/2012 | McCarthy |
| 2012/0050207 A1 | 3/2012 | Westhues et al. |
| 2012/0050216 A1 | 3/2012 | Kremin et al. |
| 2012/0056822 A1 | 3/2012 | Wilson et al. |
| 2012/0062497 A1 | 3/2012 | Rebeschi et al. |
| 2012/0062500 A1 | 3/2012 | Miller et al. |
| 2012/0068964 A1 | 3/2012 | Wright et al. |
| 2012/0086664 A1 | 4/2012 | Leto |
| 2012/0105357 A1 | 5/2012 | Li et al. |
| 2012/0105361 A1 | 5/2012 | Kremin et al. |
| 2012/0105362 A1 | 5/2012 | Kremin et al. |
| 2012/0146958 A1 | 6/2012 | Oda et al. |
| 2012/0154295 A1 | 6/2012 | Hinckley et al. |
| 2012/0154340 A1 | 6/2012 | Vuppu et al. |
| 2012/0182259 A1 | 7/2012 | Han |
| 2012/0212421 A1 | 8/2012 | Honji |
| 2012/0242603 A1 | 9/2012 | Engelhardt et al. |
| 2012/0274580 A1 | 11/2012 | Sobel et al. |
| 2012/0293464 A1 | 11/2012 | Adhikari |
| 2012/0320000 A1 | 12/2012 | Takatsuka |
| 2012/0327040 A1 | 12/2012 | Simon |
| 2012/0327041 A1 | 12/2012 | Harley |
| 2012/0331546 A1 | 12/2012 | Falkenburg |
| 2013/0027361 A1 | 1/2013 | Perski et al. |
| 2013/0069905 A1 | 3/2013 | Krah et al. |
| 2013/0088465 A1 | 4/2013 | Geller et al. |
| 2013/0106722 A1 | 5/2013 | Shahparnia et al. |
| 2013/0113707 A1 | 5/2013 | Perski et al. |
| 2013/0127757 A1 | 5/2013 | Mann et al. |
| 2013/0141342 A1 | 6/2013 | Bokma et al. |
| 2013/0176273 A1 | 7/2013 | Li et al. |
| 2013/0176274 A1 | 7/2013 | Sobel et al. |
| 2013/0207938 A1 | 8/2013 | Ryshtun et al. |
| 2013/0215049 A1 | 8/2013 | Lee |
| 2013/0257793 A1 | 10/2013 | Zeliff et al. |
| 2014/0028576 A1 | 1/2014 | Shahparnia |
| 2014/0028577 A1 | 1/2014 | Krah |
| 2014/0028607 A1 | 1/2014 | Tan |
| 2014/0077827 A1 | 3/2014 | Seguine |
| 2014/0132556 A1 | 5/2014 | Huang |
| 2014/0146009 A1 | 5/2014 | Huang |
| 2014/0168142 A1 | 6/2014 | Sasselli et al. |
| 2014/0168143 A1 | 6/2014 | Hotelling et al. |
| 2014/0267075 A1 | 9/2014 | Shahparnia et al. |
| 2014/0375612 A1 | 12/2014 | Hotelling et al. |
| 2015/0022485 A1 | 1/2015 | Chen et al. |
| 2015/0035768 A1 | 2/2015 | Shahparnia et al. |
| 2015/0035769 A1 | 2/2015 | Shahparnia |
| 2015/0035797 A1 | 2/2015 | Shahparnia |
| 2015/0338950 A1 | 11/2015 | Ningrat et al. |
| 2016/0162011 A1 | 6/2016 | Verma |
| 2016/0162101 A1 | 6/2016 | Pant et al. |
| 2016/0162102 A1 | 6/2016 | Shahparnia et al. |
| 2016/0179281 A1 | 6/2016 | Krah et al. |

FOREIGN PATENT DOCUMENTS

| | | |
|---|---|---|
| CN | 1518723 A | 8/2004 |
| CN | 101393488 B | 10/2009 |
| CN | 201329722 Y | 10/2010 |
| CN | 201837984 U | 5/2011 |
| DE | 036 02 796 A1 | 8/1987 |
| DE | 197 20 925 A1 | 12/1997 |
| EP | 0 306 596 A2 | 3/1989 |
| EP | 0 366 913 B1 | 5/1990 |
| EP | 0 384 509 B1 | 8/1990 |
| EP | 0 426 362 A2 | 5/1991 |
| EP | 0 426 469 A2 | 5/1991 |
| EP | 0 464 908 B1 | 1/1992 |
| EP | 0 488 455 B1 | 6/1992 |
| EP | 0 490 683 B1 | 6/1992 |
| EP | 0 491 436 B1 | 6/1992 |
| EP | 0 509 589 B1 | 10/1992 |
| EP | 0 545 709 B1 | 6/1993 |
| EP | 0 572 009 A1 | 12/1993 |
| EP | 0 572 182 B1 | 12/1993 |
| EP | 0 587 236 B1 | 3/1994 |
| EP | 0 601 837 B1 | 6/1994 |
| EP | 0 618 527 B1 | 10/1994 |
| EP | 0 633 542 B1 | 1/1995 |
| EP | 0 762 319 A2 | 3/1997 |
| EP | 0 762 319 A3 | 3/1997 |
| EP | 0 770 971 A2 | 5/1997 |
| EP | 0 962 881 A2 | 12/1999 |
| EP | 1 022 675 A2 | 7/2000 |
| EP | 1 128 170 A1 | 8/2001 |
| EP | 2 040 149 A2 | 3/2009 |
| EP | 2 172 834 A2 | 4/2010 |
| EP | 2 221 659 A1 | 8/2010 |
| EP | 2 660 689 A1 | 11/2013 |
| JP | 55-074635 A | 6/1980 |
| JP | 57-203129 A | 12/1982 |
| JP | 60-179823 A | 9/1985 |
| JP | 64-006927 U | 1/1989 |
| JP | 64-040004 U | 2/1989 |
| JP | 1-196620 A | 8/1989 |
| JP | 2-182581 A | 7/1990 |
| JP | 2-211421 A | 8/1990 |
| JP | 5-019233 A | 1/1993 |
| JP | 5-173707 A | 7/1993 |
| JP | 05-243547 A | 9/1993 |
| JP | 8-166849 A | 6/1996 |
| JP | 9-001279 A | 1/1997 |
| JP | 9-185457 A | 7/1997 |
| JP | 9-231002 A | 9/1997 |
| JP | 9-274537 A | 10/1997 |

(56) References Cited

FOREIGN PATENT DOCUMENTS

| | | |
|---|---|---|
| JP | 10-027068 A | 1/1998 |
| JP | 10-040004 A | 2/1998 |
| JP | 10-133817 A | 5/1998 |
| JP | 10-133819 A | 5/1998 |
| JP | 10-186136 A | 7/1998 |
| JP | 10-198515 A | 7/1998 |
| JP | 11-110110 A | 4/1999 |
| JP | 11-242562 A | 9/1999 |
| JP | 2000-020241 A | 1/2000 |
| JP | 2000-163031 A | 6/2000 |
| JP | 2002-342033 A | 11/2002 |
| JP | 2005-129948 A | 5/2005 |
| JP | 2005-352490 A | 12/2005 |
| JP | 2009-054141 A | 3/2009 |
| KR | 10-2013-0109207 A | 10/2013 |
| TW | 200743986 A | 12/2007 |
| TW | 200925944 | 6/2009 |
| TW | 201115414 A | 5/2011 |
| TW | 201118682 A1 | 6/2011 |
| TW | 201324242 A1 | 6/2013 |
| TW | 201419103 A | 5/2014 |
| TW | 201504874 A | 2/2015 |
| WO | WO-97/40488 A1 | 10/1997 |
| WO | WO-99/21160 A1 | 4/1999 |
| WO | WO-99/22338 A1 | 5/1999 |
| WO | WO-01/45283 A1 | 6/2001 |
| WO | WO-2006/104214 A1 | 10/2006 |
| WO | WO-2007/145346 A1 | 12/2007 |
| WO | WO-2007/145347 A1 | 12/2007 |
| WO | WO-2008/018201 A1 | 2/2008 |
| WO | WO-2008/044368 A1 | 4/2008 |
| WO | WO-2008/044369 A1 | 4/2008 |
| WO | WO-2008/044370 A1 | 4/2008 |
| WO | WO-2008/044371 A1 | 4/2008 |
| WO | WO-2008/047677 A1 | 4/2008 |
| WO | WO-2009/081810 A1 | 7/2009 |
| WO | WO-2011/008533 A2 | 1/2011 |
| WO | WO-2012/177567 A1 | 12/2012 |
| WO | WO-2012/177571 A1 | 12/2012 |
| WO | WO-2012/177573 A2 | 12/2012 |
| WO | WO-2012/177569 A2 | 3/2013 |
| WO | WO-2012/177569 A3 | 3/2013 |
| WO | WO-2014/018233 A1 | 1/2014 |
| WO | WO-2014/143430 A1 | 9/2014 |
| WO | WO-2015/017196 A1 | 2/2015 |

OTHER PUBLICATIONS

Non-Final Office Action mailed May 14, 2015, for U.S. Appl. No. 13/560,963, filed Jul. 27, 2012, twelve pages.
Non-Final Office Action mailed May 22, 2015, for U.S. Appl. No. 13/831,318, filed Mar. 14, 2013, eight pages.
Final Office Action mailed Aug. 20, 2015, for U.S. Appl. No. 13/166,711, filed Jun. 22, 2011, six pages.
Non-Final Office Action mailed Aug. 28, 2015, for U.S. Appl. No. 13/560,958, filed Jul. 27, 2012, 11 pages.
Non-Final Office Action mailed Sep. 24, 2015, for U.S. Appl. No. 13/166,699, filed Jun. 22, 2011, 14 pages.
Chinese Search Report dated Sep. 6, 2015, for CN Application No. CN 201280030349.9, with English translation, six pages.
Abileah, A. et al. (2004). "59.3: Integrated Optical Touch Panel in a 14.1' AMLCD,"*SID '04 Digest* (Seattle) pp. 1544-1547.
Abileah, A. et al. (2006). "9.3: Optical Sensors Embedded within AMLCD Panel: Design and Applications," *ADEAC '06, SID* (Atlanta) pp. 102-105.
Abileah, A. et al. (2007). "Optical Sensors Embedded within AMLCD Panel: Design and Applications," *SIGGRAPH-07*, San Diego, 5 pages.
Anonymous. (2002). "Biometric Smart Pen Project," located at http://www.biometricsmartpen.de/ . . . , last visited Apr. 19, 2011, one page.
Bobrov, Y. et al. (2002). "5.2 Manufacturing of a Thin-Film LCD," *Optiva, Inc.*, San Francisco, CA. 4 pages.
Brown, C. et al. (2007). "7.2: A 2.6 inch VGA LCD with Optical Input Function using a 1-Transistor Active-Pixel Sensor," *ISSCC 2007* pp. 132-133, 592.
Den Boer, W. et al. (2003). "56.3: Active Matrix LCD with Integrated Optical Touch Screen," *SID '03 Digest* (Baltimore) pp. 1-4.
Echtler, F. et al. (Jan. 2010). "An LED-based Multitouch Sensor for LCD Screens," Cambridge, MA *ACM* 4 pages.
Final Office Action mailed Mar. 4, 2004, for U.S. Appl. No. 10/217,798, filed Aug. 12, 2002, 17 pages.
Final Office Action mailed Jan. 21, 2005, for U.S. Appl. No. 10/329,217, filed Dec. 23, 2002, 13 pages.
Final Office Action mailed Aug. 9, 2005, for U.S. Appl. No. 10/442,433, filed May 20, 2003, six pages.
Final Office Action mailed Aug. 23, 2005, for U.S. Appl. No. 10/217,798, filed Aug. 12, 2002, 10 pages.
Final Office Action mailed Dec. 13, 2005, for U.S. Appl. No. 10/371,413, filed Feb. 20, 2003, six pages.
Final Office Action mailed May 23, 2007, for U.S. Appl. No. 11/137,753, filed May 25, 2005, 11 pages.
Final Office Action mailed Oct. 18, 2007, for U.S. Appl. No. 11/351,098, filed Feb. 8, 2006, six pages.
Final Office Action mailed Oct. 31, 2007, for U.S. Appl. No. 10/217,798, filed Aug. 12, 2002, nine pages.
Final Office Action mailed Mar. 24, 2009, for U.S. Appl. No. 11/351,098, filed Feb. 8, 2006, 10 pages.
Final Office Action mailed Feb. 10, 2011, for U.S. Appl. No. 11/901,649, filed Sep. 18, 2007, 20 pages.
Final Office Action mailed May 18, 2011, for U.S. Appl. No. 11/978,031, filed Oct. 25, 2007, 17 pages.
Final Office Action mailed Jun. 15, 2011, for U.S. Appl. No. 11/595,071, filed Nov. 8, 2006, 9 pages.
Final Office Action mailed Jun. 24, 2011, for U.S. Appl. No. 11/978,006, filed Oct. 25, 2007, 12 pages.
Final Office Action mailed Jul. 5, 2011, for U.S. Appl. No. 11/977,279, filed Oct. 24, 2007, 12 pages.
Final Office Action mailed Sep. 29, 2011, for U.S. Appl. No. 11/977,911, filed Oct. 26, 2007, 22 pages.
Final Office Action mailed Oct. 11, 2012, for U.S. Appl. No. 12/566,455, filed Sep. 24, 2009, 8 pages.
Final Office Action mailed Oct. 25, 2012, for U.S. Appl. No. 12/568,302, filed Sep. 28, 2009, 13 pages.
Final Office Action mailed Oct. 25, 2012, for U.S. Appl. No. 12/568,316, filed Sep. 28, 2009, 15 pages.
Final Office Action mailed Jul. 26, 2013, for U.S. Appl. No. 13/166,726, filed Jun. 22, 2011, ten pages.
Final Office Action mailed Oct. 31, 2013, for U.S. Appl. No. 13/166,699, filed Jun. 22, 2011, 13 pages.
Final Office Action mailed Jan. 13, 2014, for U.S. Appl. No. 12/568,316, filed Sep. 28, 2009, 15 pages.
Final Office Action mailed Apr. 28, 2014, for U.S. Appl. No. 13/652,007, filed Oct. 15, 2012, 16 pages.
Final Office Action mailed Jul. 14, 2014, for U.S. Appl. No. 13/166,711, filed Jun. 22, 2011, 12 pages.
Final Office Action mailed Dec. 2, 2014, for U.S. Appl. No. 13/560,963, filed Jul. 27, 2012, ten pages.
Final Office Action mailed Dec. 16, 2014, for U.S. Appl. No. 13/560,958, filed Jul. 27, 2012, twelve pages.
Hong, S.J. et al. (2005). "Smart LCD Using a-Si Photo Sensor," *IMID'05 Digest* pp. 280-283.
International Preliminary Report on Patentability and Written Opinion mailed Oct. 8, 2004, for PCT Application No. PCT/US03/05300, filed Feb. 20, 2003, 15 pages.
International Preliminary Report on Patentability and Written Opinion mailed Dec. 30, 2004, for PCT Application No. PCT/US02/25573, filed Aug. 12, 2002, 16 pages.
International Preliminary Report on Patentability and Written Opinion mailed May 14, 2008, for PCT Application No. PCT/US06/43741, filed Nov. 10, 2006, four pages.
International Search Report mailed Apr. 14, 2003, for PCT Application No. PCT/US02/25573, filed Aug. 12, 2002 two pages.

(56) References Cited

OTHER PUBLICATIONS

International Search Report mailed Jun. 16, 2003, for PCT Application No. PCT/US03/05300, filed Feb. 20, 2003, two pages.
International Search Report mailed Nov. 11, 2003, for PCT Application No. PCT/US03/03277, filed Feb. 4, 2003, three pages.
International Search Report mailed Sep. 21, 2007, for PCT Application No. PCT/US06/43741, filed Nov. 10, 2006, one page.
International Search Report mailed Oct. 17, 2012, for PCT Application No. PCT/US2012/043019, filed Jun. 18, 2012, five pages.
International Search Report mailed Oct. 17, 2012, for PCT Application No. PCT/US2012/043023, filed Jun. 18, 2012, six pages.
International Search Report mailed Jan. 16, 2013, for PCT Application No. PCT/US2012/043021, filed Jun. 18, 2012, six pages.
International Search Report mailed Sep. 12, 2013, for PCT Application No. PCT/US2013/048977, filed Jul. 1, 2013, six pages.
International Search Report mailed Apr. 23, 2014, for PCT Application No. PCT/US2014/013927, filed Jan. 30, 2014, four pages.
International Search Report mailed Oct. 30, 2014 for PCT Application No. PCT/US2014/047658, four pages.
Kim, J.H. et al. (May 14, 2000). "24.1: Fingerprint Scanner Using a-Si: H TFT-Array," *SID '00 Digest* pp. 353-355.
Kis, A. (2006). "Tactile Sensing and Analogic Algorithms," Ph.D. Dissertation, Peter Pazmany Catholic University, Budapest, Hungary 122 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed Jun. 4, 2003, for U.S. Appl.n No. 10/217,798, filed Aug. 12, 2002, 16 pages.
Non-Final Office Action mailed May 21, 2004, for U.S. Appl. No. 10/329,217, filed Dec. 23, 2002, 13 pages.
Non-Final Office Action mailed Sep. 21, 2004, for U.S. Appl. No. 10/442,433, filed May 20, 2003, six pages.
Non-Final Office Action mailed Nov. 26, 2004, for U.S. Appl. No. 10/307,106, filed Nov. 27, 2002, eight pages.
Non-Final Office Action mailed Dec. 10, 2004, for U.S. Appl. No. 10/217,798, filed Aug. 12, 2002, nine pages.
Non-Final Office Action mailed Jan. 21, 2005, for U.S. Appl. No. 10/347,149, filed Jan. 17, 2003, nine pages.
Non-Final Office Action mailed Apr. 15, 2005, for U.S. Appl. No. 10/371,413, filed Feb. 20, 2003, four pages.
Non-Final Office Action mailed Jun. 22, 2005, for U.S. Appl. No. 10/739,455, filed Dec. 17, 2003, 10 pages.
Non-Final Office Action mailed Jul. 12, 2005, for U.S. Appl. No. 10/347,149, filed Jan. 17, 2003, four pages.
Non-Final Office Action mailed Jan. 13, 2006, for U.S. Appl. No. 10/217,798, filed Aug. 12, 2002, nine pages.
Non-Final Office Action mailed May 12, 2006, for U.S. Appl. No. 10/217,798, filed Aug. 12, 2002, seven pages.
Non-Final Office Action mailed Aug. 28, 2006, for U.S. Appl. No. 10/371,413, filed Feb. 20, 2003, six pages.
Non-Final Office Action mailed Jun. 28, 2007, for U.S. Appl. No. 11/351,098, filed Feb. 8, 2006, 12 pages.
Non-Final Office Action mailed Jun. 29, 2007, for U.S. Appl. No. 10/217,798, filed Aug. 12, 2002, 10 pages.
Non-Final Office Action mailed Feb. 25, 2008, for U.S. Appl. No. 11/137,753, filed May 25, 2005, 15 pages.
Non-Final Office Action mailed Jun. 24, 2008, for U.S. Appl. No. 11/351,098, filed Feb. 8, 2006, 11 pages.
Non-Final Office Action mailed Jun. 25, 2009, for U.S. Appl. No. 11/980,029, filed Oct. 29, 2007, 9 pages.
Non-Final Office Action mailed Nov. 23, 2009, for U.S. Appl. No. 11/407,545, filed Apr. 19, 2006, five pages.
Non-Final Office Action mailed Jul. 29, 2010, for U.S. Appl. No. 11/901,649, filed Sep. 18, 2007, 20 pages.
Non-Final Office Action mailed Oct. 13, 2010, for U.S. Appl. No. 11/978,006, filed Oct. 25, 2007, eight pages.
Non-Final Office Action mailed Oct. 14, 2010, for U.S. Appl. No. 11/595,071, filed Nov. 8, 2006, seven pages
Non-Final Office Action mailed Nov. 26, 2010, for U.S. Appl. No. 11/977,279, filed Oct. 24, 2007, nine pages.
Non-Final Office Action mailed Nov. 26, 2010, for U.S. Appl. No. 11/977,830, filed Oct. 26, 2007, seven pages.
Non-Final Office Action mailed Dec. 13, 2010, for U.S. Appl. No. 11/977,339, filed Oct. 24, 2007, eight pages.
Non-Final Office Action mailed Feb. 1, 2011, for U.S. Appl. No. 11/978,031, filed Oct. 25, 2007, 18 pages.
Non-Final Office Action mailed Apr. 29, 2011, for U.S. Appl. No. 11/977,911, filed Oct. 26, 2007, 19 pages.
Non-Final Office Action mailed Jun. 21, 2011, for U.S. Appl. No. 11/977,339, filed Oct. 24, 2007, 10 pages.
Non-Final Office Action mailed Jun. 28, 2011, for U.S. Appl. No. 12/852,883, filed Aug. 8, 2010, 16 pages.
Non-Final Office Action mailed Nov. 2, 2011, for U.S. Appl. No. 12/568,316, filed Sep. 28, 2009, 31 pages.
Non-Final Office Action mailed Nov. 4, 2011, for U.S. Appl. No. 12/568,302, filed Sep. 28, 2009, 29 pages.
Non-Final Office Action mailed Nov. 17, 2011, for U.S. Appl. No. 11/977,339, filed Oct. 24, 2007, nine pages.
Non-Final Office Action mailed Jan. 10, 2012, for U.S. Appl. No. 11/977,864, filed Oct. 26, 2007, six pages.
Non-Final Office Action mailed Jan. 31, 2012, for U.S. Appl. No. 12/566,477, filed Sep. 24, 2009, 11 pages.
Non-Final Office Action mailed Feb. 29, 2012, for U.S. Appl. No. 11/978,031, filed Oct. 25, 2007, 20 pages.
Non-Final Office Action mailed Apr. 20, 2012, for U.S. Appl. No. 12/566,455, filed Sep. 24, 2009, eight pages.
Non-Final Office Action mailed Jun. 5, 2012, for U.S. Appl. No. 11/595,071, filed Nov. 8, 2006, 14 pages.
Non-Final Office Action mailed Jun. 19, 2012, for U.S. Appl. No. 11/977,864, filed Oct. 26, 2007, seven pages.
Non-Final Office Action mailed Nov. 15, 2012, for U.S. Appl. No. 12/566,477, filed Sep. 24, 2009, 11 pages.
Non-Final Office Action mailed Mar. 5, 2013, for U.S. Appl. No. 13/166,726, filed Jun. 22, 2011, 14 pages.
Non-Final Office Action mailed Mar. 29, 2013, for U.S. Appl. No. 13/166,699, filed Jun. 22, 2011, 12 pages.
Non-Final Office Action mailed Jun. 17, 2013, for U.S. Appl. No. 13/166,711, filed Jun. 22, 2011, 8 pages.
Non-Final Office Action mailed Sep. 18, 2013, for U.S. Appl. No. 13/652,007, filed Oct. 15, 2012, 16 pages.
Non-Final Office Action mailed Dec. 16, 2013, for U.S. Appl. No. 13/166,711, filed Jun. 22, 2011, 12 pages.
Non-Final Office Action mailed Feb. 27, 2014, for U.S. Appl. No. 11/977,279, filed Oct. 24, 2007, 11 pages.
Non-Final Office Action mailed Mar. 14, 2014, for U.S. Appl. No. 11/977,339, filed Oct. 24, 2007, 10 pages.
Non-Final Office Action mailed Apr. 24, 2014, for U.S. Appl. No. 13/560,958, filed Jul. 27, 2012, nine pages.
Non-Final Office Action mailed May 8, 2014, for U.S. Appl. No. 13/560,973, filed Jul. 27, 2012, six pages.
Non-Final Office Action mailed Jun. 4, 2014, for U.S. Appl. No. 13/560,963, filed Jul. 27, 2012, nine pages.
Non-Final Office Action mailed Jun. 27, 2014, for U.S. Appl. No. 13/166,699, filed Jun. 22, 2011, 13 pages.
Notice of Allowance mailed Feb. 3, 2014, for U.S. Appl. No. 13/166,726, filed Jun. 22, 2011, nine pages.
Notice of Allowance mailed May 12, 2014, for U.S. Appl. No. 13/166,726, filed Jun. 22, 2011, nine pages.
Notice of Allowance mailed Sep. 4, 2014, for U.S. Appl. No. 13/166,726, filed Jun. 22, 2011, nine pages.
Notification of Reasons for Rejection mailed Dec. 19, 2011, for JP Patent Application No. 2008-540205, with English Translation, six pages.
Pye, A. (Mar. 2001). "Top Touch-Screen Options," located at http://www.web.archive.org/web/20010627162135.http://www.industrialtechnology.co.uk/2001/mar/touch.html, last visited Apr. 29, 2004, two pages.
Rossiter, J. et al. (2005). "A Novel Tactile Sensor Using a Matrix of LEDs Operating in Both Photoemitter and Photodetector Modes," *IEEE* pp. 994-997.

(56) References Cited

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Search Report dated Jun. 12, 2014, for ROC (Taiwan) Patent Application No. 101122110, one page.
TW Search Report dated Jul. 7, 2014, for TW Patent Application No. 101122109, filed Jun. 20, 2012, one page.
TW Search Report dated Jul. 8, 2014, for TW Patent Application No. 101122107, filed Jun. 20, 2012, one page.
U.S. Appl. No. 60/359,263, filed Feb. 20, 2002, by den Boer et al.
U.S. Appl. No. 60/383,040, filed May 23, 2002, by Abileah et al.
U.S. Appl. No. 60/736,708, filed Nov. 14, 2005, by den Boer et al.
U.S. Appl. No. 60/821,325, filed Aug. 3, 2006, by Abileah et al.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Yamaguchi, M. et al. (Jan. 1993). "Two-Dimensional Contact-Type Image Sensor Using Amorphous Silicon Photo-Transistor," *Jpn. J. Appl. Phys.* 32(Part 1, No. 1B):458-461.
Final Office Action mailed Jan. 12, 2015, for U.S. Appl. No. 13/560,973, filed Jul. 27, 2012, six pages.
Non-Final Office Action mailed Jan. 30, 2015, for U.S. Appl. No. 13/166,711, filed Jun. 22, 2011, 12 pages.
Chinese Search Report dated Oct. 23, 2015, for CN Application No. CN 201280030351.6, with English translation, four pages.
Non-Final Office Action mailed Dec. 4, 2015, for U.S. Appl. No. 14/333,461, filed Jul. 16, 2014, 15 pages.
Notice of Allowance mailed Dec. 15, 2015, for U.S. Appl. No. 13/560,973, filed Jul. 27, 2012, nine pages.
TW Search Report dated Nov. 20, 2015, for TW Patent Application No. 103126285, one page.
European Search Report dated May 2, 2016, for EP Application No. 15196245.3, filed Nov. 25, 2015, twelve pages.
Final Office Action mailed Feb. 1, 2016, for U.S. Appl. No. 13/560,963, filed Jul. 27, 2012, 12 pages.
Final Office Action mailed Feb. 3, 2016, for U.S. Appl. No. 13/166,699, filed Jun. 22, 2011, 15 pages.
Final Office Action mailed Mar. 9, 2016, for U.S. Appl. No. 13/831,318, filed Mar. 14, 2013, nine pages.
Final Office Action mailed Jun. 3, 2016, for U.S. Appl. No. 14/333,461, filed Jul. 16, 2014, eight pages.
Non-Final Office Action mailed May 13, 2016, for U.S. Appl. No. 15/057,035, filed Feb. 29, 2016, six pages.
Non-Final Office Action mailed May 17, 2016, for U.S. Appl. No. 14/333,382, filed Jul. 16, 2014, sixteen pages.
Non-Final Office Action mailed Jul. 1, 2016, for U.S. Appl. No. 14/333,457, filed Jul. 16, 2014, 27 pages.
Notice of Allowance mailed Jan. 14, 2016, for U.S. Appl. No. 13/166,711, filed Jun. 22, 2011, five pages.
Notice of Allowance mailed May 24, 2016, for U.S. Appl. No. 13/560,958, filed Jul. 27, 2012, ten pages.

ACTIVE STYLUS

This application is the Continuation of U.S. application Ser. No. 13/166,726 filed Jun. 22, 2011, now U.S. Pat. No. 8,928,635 B2, and the entire disclosure is expressly incorporated by reference herein.

FIELD

This relates generally to touch sensing, and more particularly, to providing a stylus that can act as a drive and/or sense element in a capacitive touch system.

BACKGROUND

Many types of input devices are available for performing operations in a computing system, such as buttons or keys, mice, trackballs, touch sensor panels, joysticks, touch pads, touch screens, and the like. Touch sensitive devices, and touch screens, in particular, are becoming increasingly popular because of their ease and versatility of operation as well as their declining price. Touch sensitive devices can include a touch sensor panel, which can be a clear panel with a touch sensitive surface, and a display device such as a liquid crystal display (LCD) that can be positioned partially or fully behind the panel, or integrated with the panel, so that the touch sensitive surface can substantially cover the viewable area of the display device. Touch sensitive devices can generally allow a user to perform various functions by touching or hovering over the touch sensor panel using one or more fingers, a stylus or other object at a location often dictated by a user interface (UI) including virtual buttons, keys, bars, displays, and other elements, being displayed by the display device. In general, touch screens can recognize a touch event and the position of the touch event on the touch sensor panel or a hover event and the position of the hover event on the touch sensor panel, and the computing system can then interpret the touch or hover event in accordance with the display appearing at the time of the event, and thereafter can perform one or more operations based on the event.

Touch screens can allow a user to perform various functions by touching the touch sensor panel using a finger, stylus or other object. More advanced touch screens are capable of detecting multiple touches simultaneously. In general, touch screens can recognize the position of the one or more touches on the touch sensor panel, and a computing system can then interpret the touches, either individually or as a single gesture in accordance with the display appearing at the time of the touch event, and thereafter can perform one or more actions based on the touch event.

When a stylus has been used as an input device in a capacitive touch system, the stylus has traditionally been finger-like in nature. A conventional stylus is often simply a conductive rod with a finger-sized rounded tip large enough to disrupt the electric field lines between the drive and sense electrodes of a capacitive touch sensor panel. As such, conventional styluses are passive input devices in that they are incapable of actively transmitting stimulus signals or sensing a touch-induced capacitance change in a capacitive touch sensor panel.

SUMMARY

This generally relates to a stylus that can act as a drive and/or a sense element in a capacitive touch system. Unlike conventional styluses which work passively by blocking electric field lines between the drive and sense electrodes of a capacitive touch sensor panel, the styluses disclosed in the various embodiments of this disclosure can either act as a drive electrode to create an electric field between the drive electrode and the sense lines of a mutual capacitive touch sensor panel, or as a sense electrode for sensing capacitively coupled signals from one or more stimulated drive rows and columns of the touch sensor panel or both. Accordingly, the styluses disclosed herein can be referred to as active styluses in comparison to conventional passive styluses. These active styluses can significantly improve stylus sensing on a mutual capacitive touch sensor panel without incurring significant additional cost.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This generally relates to a stylus that can act as a drive and/or a sense element in a capacitive touch system. Unlike conventional styluses which work passively by blocking electric field lines between the drive and sense electrodes of a capacitive touch sensor panel, the styluses disclosed in the various embodiments of this disclosure can either act as a drive electrode to create an electric field between the drive electrode and the sense lines of a mutual capacitive touch sensor panel, or as a sense electrode for sensing capacitively coupled signals from one or more stimulated drive rows and columns of the touch sensor panel or both. Accordingly, the styluses disclosed herein can be referred to as active styluses in comparison to conventional passive styluses. These active styluses can significantly improve stylus sensing on a mutual capacitive touch sensor panel without incurring significant additional cost.

In the following paragraphs, a brief description of the structure of a typical capacitive touch sensor panel and its interaction with a conventional passive stylus is first discussed before the various exemplary embodiments of the disclosure are introduced.

Capacitive touch sensor panels are well known in the art and have been widely adopted in various types of electronic devices, such as tablet PCs (e.g., the iPad® from Apple Inc. of Cupertino, Calif.) and smartphones (e.g., the iPhone® from Apple Inc. of Cupertino, Calif.). One popular type of capacitive touch sensor panel can include a mutual capacitive touch sensor panel formed from drive and sense lines (e.g., rows and columns of traces) on opposite sides of a dielectric, or adjacent to each other on the same side of a substrate. At the "intersections" of the traces, where the traces pass above and below or are adjacent to each other (but do not make direct electrical contact with each other), the traces essentially form two electrodes. In one embodiment, touch sensor panels for use over display devices may utilize a top layer of glass upon which transparent column traces of indium tin oxide (ITO) or antimony tin oxide (ATO) have been etched, and a bottom layer of glass upon which row traces of ITO have been etched. The top and bottom glass layers can be separated by a clear polymer spacer that acts as a dielectric between the row and column traces. Other touch sensor panel configurations, such as those with drive and sense lines on opposite sides of a substrate or on the same side of a substrate, and self-capacitance touch sensor panels are also contemplated for use with embodiments of the disclosure.

Figure 1A:
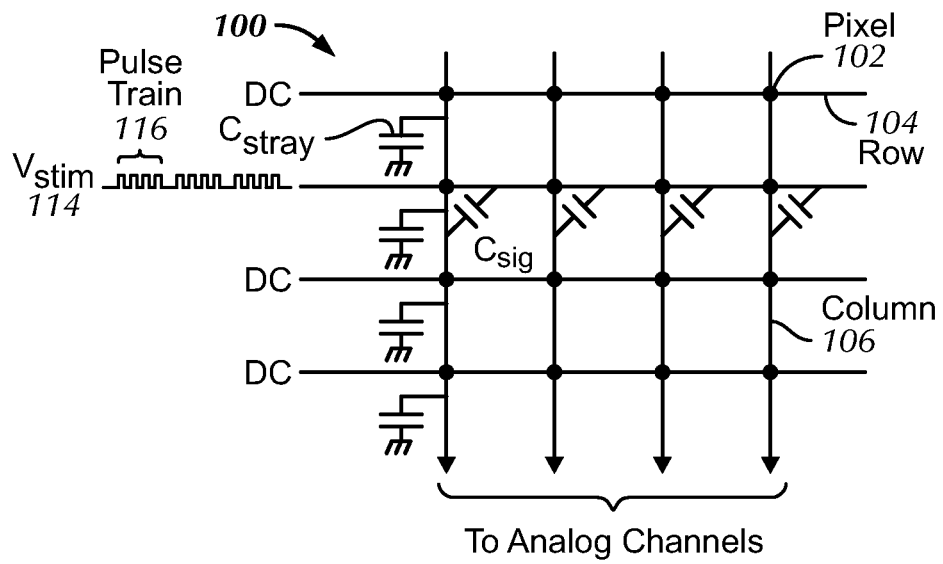
FIG. 1a illustrates the underlying structure of an exemplary capacitive touch sensor panel.

FIG. 1a illustrates an exemplary capacitive touch sensor panel 100. FIG. 1a indicates the presence of a stray capacitance Cstray at each pixel 102 located at the intersection of a row 104 and a column 106 traces (although Cstray for only one column is illustrated in FIG. 1a for purposes of simplifying the figure). Note that although FIG. 1a illustrates rows 104 and columns 106 as being substantially perpendicular, they need not be so aligned. In the example of FIG. 1a, AC stimulus Vstim 114 is being applied to one row, with all other rows connected to DC. The stimulus causes a charge to be injected in to the column electrodes through mutual capacitance at the intersection points. Each of columns 106 may be selectively connectable to one or more analog channels.

Figure 1B:
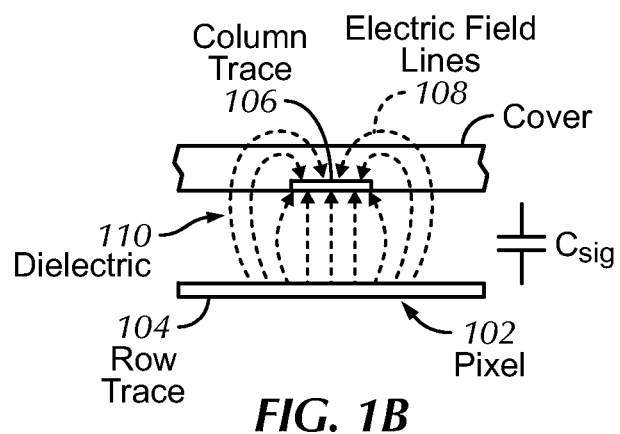
FIGS. 1b and 1c illustrate the capacitive touch sensor panel of FIG. 1a interacting with an exemplary passive stylus.

FIG. 1b provides a side view of exemplary touch pixel 102 in a steady-state (no-touch) condition. In FIG. 1b, an electric field of electric field lines 108 of the mutual capacitance between column 106 and row 104 traces or electrodes separated by dielectric 110 is shown.

Figure 1C:
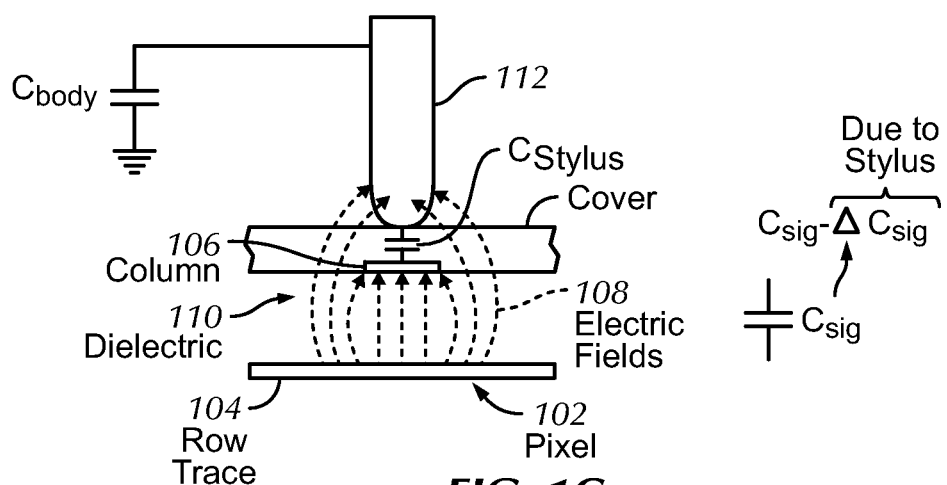

FIG. 1c provides a side view of exemplary pixel 102 in a dynamic (touch) condition. In FIG. 1c, a conductive object 112 has been placed near pixel 102. As shown, the conductive object 112 can be a stylus. However, it should be understood that the conductive object 112 can also be a finger or anything else that is conductive. The conductive object 112 can be a low-impedance object at signal frequencies, and can have a capacitance Cstylus from the column trace 104 to the object. The conductive object 112 can have a self-capacitance to ground Cbody that is much larger than Cstylus. If the conductive object 112 blocks some electric field lines 108 between the row and column electrodes (those fringing fields that exit the dielectric and pass through the air above the row electrode), those electric field lines can be shunted to ground through the capacitive path inherent in the conductive object, and as a result, the steady state signal or mutual capacitance Csig can be reduced by ΔCsig (which can also be referred to herein as Csig_sense). In other words, the capacitance of the conductive object can act as a shunt or dynamic return path to ground, blocking some of the electric fields and resulting in a reduced net signal capacitance.

When a conventional stylus is used as the conductive object, the tip of the stylus is typically designed to be large enough to disrupt the electric field lines. In fact, many conventional styluses designed to be used on a capacitive touch sensor panel have finger-sized tips. A stylus with a small tip may not block enough electric field lines to be detectable by a capacitive touch sensor panel.

When the conductive object acts as a shunt to ground and blocks some of the electric field lines, the signal capacitance at the pixel becomes Csig−ΔCsig, where Csig represents the static (no touch) component and ΔCsig represents the dynamic (touch) component. This change in capacitance can be used to detect a touch at a particular location (e.g., pixel 102) of the touch sensor panel. Multiple touches can also be detected simultaneously on a touch sensor panel by determining whether there is a change in capacitance at each of the pixels of the touch sensor panel using the same method as discussed above.

There are several shortcomings of the conventional passive stylus discussed above. First, as mentioned above, the passive stylus needs to have a tip big enough to interrupt the electric field from the capacitive touch sensor panel. This would make it less ideal, if not impossible, to use a stylus with a small tip on existing capacitive touch sensor panels. Moreover, because the tip is relatively large on the passive stylus and may overlap with multiple touch pixels of the touch sensor panel, the exact location of a touch by the stylus may be difficult to ascertain. In addition, because the passive stylus works in the same way as a finger or any other touch object, a touch by a passive stylus may not be distinguishable from the a touch by a finger or another object of similar size and shape, thus making it more difficult for a touch sensor panel to filter out touches based on the identity of the touch object.

Embodiments of this disclosure introduce various active styluses that can be free of some or all of the shortcomings of conventional passive styluses and can provide improved stylus sensing in a mutual capacitive touch system. As mentioned above, an active stylus disclosed herein can act as a drive electrode, sense electrode, or both in a mutual capacitive touch system.

Embodiments in which the stylus can act as a drive electrode are first discussed. In these embodiments, the stylus can act as a driving element stimulated by a stimulation signal to capacitively couple with a proximate conductive row and/or column of a mutual capacitive touch sensor panel, thereby forming a capacitive path for coupling charge from the stylus to that proximate row and/or column. The proximate row and/or column can output signals representative of the charge coupling to sensing circuitry.

Figure 2:
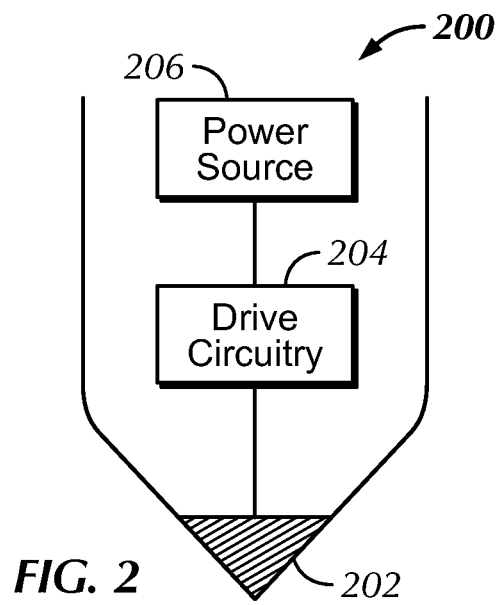
FIG. 2 illustrates an exemplary active stylus for use with a capacitive touch sensor panel according to various embodiments.

FIG. 2 illustrates an exemplary active stylus 200 configured as a drive electrode. The stylus 200 can house drive circuitry 204 connected to an electrode 202 at the distal end (i.e., tip) of the stylus. The drive circuitry 204 can generate a stimulus signal which can be actively transmitted from the electrode 202.

Figure 3:
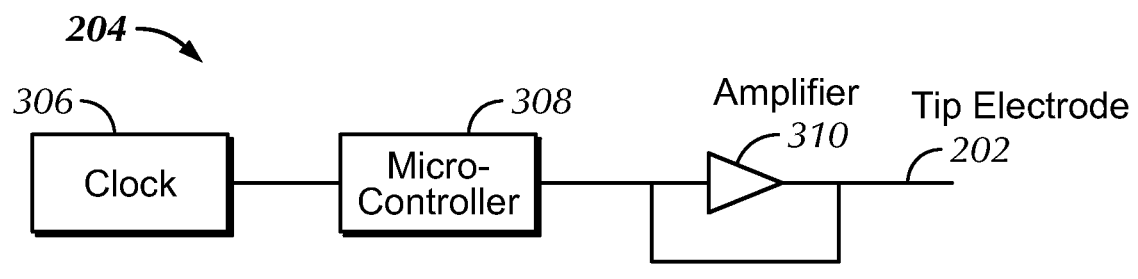
FIG. 3 illustrates exemplary drive circuitry of the active stylus of FIG. 2 according to various embodiments.

The drive circuitry 204 can be similar to those found in existing capacitive touch sensor panels. FIG. 3 illustrates exemplary drive circuitry 204 of the stylus 200 according to various embodiments. The stylus driving circuitry 204 can include clock 306 to provide a drive signal, microcontroller 308 to control the drive signal, and amplifier 310 to gain up the clock signal to the tip electrode 202. Additionally, the drive circuitry 204 can be connected to a power source 206, such as a battery, built in the stylus. In another embodiment, power can be supplied from a power source in another electronic device, such as a touch sensing device, via a cable connecting the stylus and the device, or via inductive coupling.

In the embodiments where the stylus acts as a drive electrode (e.g., the stylus 200 of FIG. 2), a capacitive touch sensor panel can detect charge coupled into sense lines on the panel by the stimulus from the stylus and determine the location of the stylus on its surface. Conventional mutual capacitive touch sensor panels typically have the sense electrodes either in columns (as shown in FIG. 1a) or in rows, but not both. Those touch sensor panels can determine the location of a touch by identifying the drive row that was stimulated and the sense column that has detected a change in capacitance. However, in the embodiments disclosed herein, when the stimulus is received from an active stylus, both rows and columns on the capacitive touch sensor panel can be sense lines to determine the location of the stylus touch.

Figure 4:
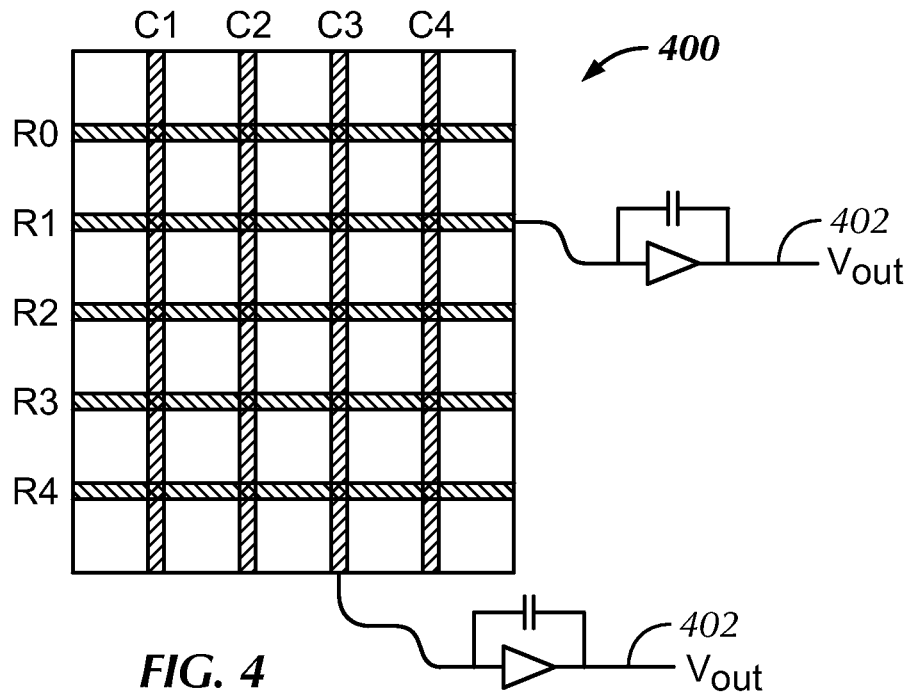
FIG. 4 illustrates the structure of an exemplary capacitive touch sensor panel according to various embodiments.

FIG. 4 illustrates an exemplary capacitive touch sensor panel 400 designed for interacting with an active stylus acting as a drive electrode. As illustrated, the capacitive touch sensor panel 400 can include both sense rows (R0-R4) and sense columns (C0-C3). Although five rows and four columns are illustrated in FIG. 4, it should be understood that a different number of sense rows and sense columns can be built based on, for example, the size of the touch sensor panel and the desired touch resolution of the touch sensor panel. The sense rows and columns can be conductive. Each of the sense rows and columns can output its capacitance readings to one or more sensing circuits (collectively 402) for further processing. The sense rows and columns can be formed on the same surface of a substrate, on opposite surfaces of a substrate, or on the surfaces of two different substrates.

Figure 5:
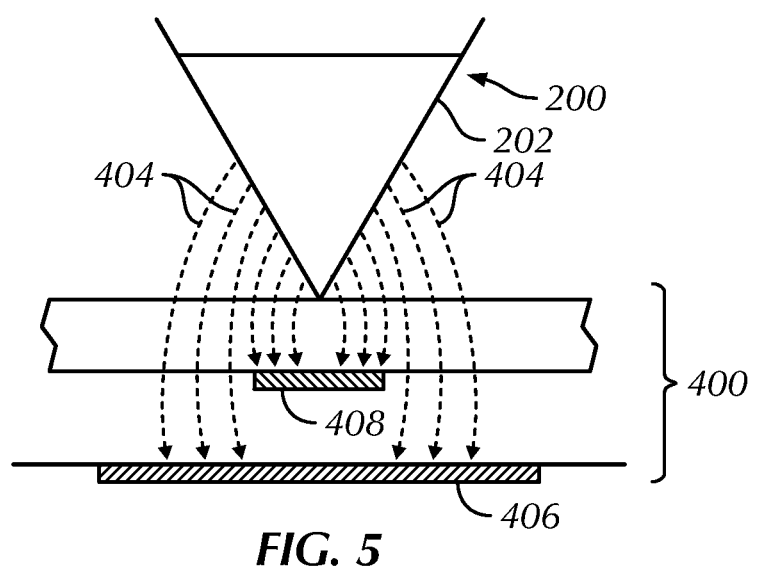
FIG. 5 illustrates the interaction between the active stylus of FIG. 2 with the touch sensor panel of FIG. 4 according to various embodiments.

FIG. 5 illustrates an exemplary coupling of the active stylus of FIG. 2 with the sense lines of the capacitive touch sensor panel of FIG. 4. As illustrated, when the stylus tip is in contact with (or in close proximity to) the capacitive touch sensor panel 400, the electrode 202 in the tip can be stimulated to actively generate electric field lines (collectively 404) and form a capacitive coupling with the sense row 406 and/or column 408 of the capacitive touch sensor panel 400. In other words, a capacitive path can be formed for coupling charge from the stylus 200 to the sense row 406 and column 408. The sense row 406 and column 408 can output signals representative of the charge coupling to sensing circuitry (not shown in FIG. 5). Based on the row(s) and column(s) from which the signals are received, the location of the stylus touch can be determined.

In some embodiments, the stylus 200 can include multiple electrodes which, when capacitively coupled to the touch sensor panel, allows the touch sensor panel to capture touch data reflecting conditions of the stylus such as its orientation and barrel roll. These embodiments are fully described in a U.S. patent application (application Ser. No. 13/166,743), filed on the same day as the instant application and assigned to the common assignee of the instant application. That application is incorporated by reference herein in its entirety for all purposes.

In some other embodiments, the stylus 200 can incorporate one or more additional components such as a pressure sensor, motion/orientation sensor, accelerometer, touch sensor, rotation sensor, camera, light emitter, color sensor, etc. Using one or more of the additional components, the stylus can capture information such as pressure sensed at its tip, orientation and rotation information, or the distance between the tip of the stylus and a surface. These embodiments are fully described in another U.S. patent application (application Ser. No. 13/166,711), filed on the same day as the instant application and assigned to the common assignee of the instant application. That application is also incorporated by reference herein in its entirety for all purposes.

In yet other embodiments, the stylus 200 can generate a pulsed signal which can encode and transmit data such as telemetry data about the stylus and other types of data from the stylus to a touch sensing device. In one embodiment, the data can, for example, be encoded in Morse code. Essentially, the stylus can utilize a touch sensor panel as a communication channel to directly transmit data to the host touch sensing device. These embodiments are fully described in yet another U.S. patent application (application Ser. No. 13/166,699), also filed on the same day as the instant application and assigned to the common assignee of the instant application. That application is also incorporated by reference herein in its entirety for all purposes.

In some embodiments, the capacitive touch sensor panel can also include built-in drive lines. For example, the touch sensor panel of FIG. 4 can include drive lines either in columns or rows (not shown) as in a conventional mutual capacitive touch sensor panel. If the drive lines are in rows, they can capacitively couple with the column sense lines (C0-C3). If the drive lines are in columns, they can capacitively couple with the row sense lines (R0-R4). This allows the touch sensor panel to be able to detect touches by other touch objects such as fingers and conventional passive styluses. In fact, the touch sensor panel can retain all functionalities provided in existing mutual capacitive touch sensor panels.

In one embodiment, the drive electrodes in the touch sensor panel and the stylus can be frequency-multiplexed, i.e., stimulated at different frequencies. For example, the drive lines in the touch sensor panel can be driven at 100 kHz and the electrode in the stylus can be driven at 200 kHz. In another embodiment, the drive electrodes in the touch sensor panel and the stylus can be time-multiplexed, i.e., stimulated at different times. For example, in a touch sensor panel where a total of 16 ms is allocated for touch sensor panel sensing, 15 ms can be used for driving the drive lines in the touch sensor panel and the remaining one ms can be for driving the stylus. Using either frequency multiplexing or time multiplexing, a touch by the stylus can be differentiated from other touches on the touch sensor panel. A variety of other voltage patterns can also be used to distinguish stylus from touch signals, such as those used in RF communication.

In an existing capacitive touch sensor panel having both drive and sense lines, the output signal from a sense line can be mixed with a copy of the original drive signal by a mixer to generate a DC signal proportional to the capacitance of the coupling between the drive and sense line in response to a touch. To obtain a correct DC signal, the output signal from the sense line and the original signal should be in phase when they are processed by the mixer. This should not pose a difficult problem in existing touch sensor panels where the drive and sense lines are both in the panel and can be easily synchronized. If the drive electrode is in the stylus, as in the embodiments disclosed above, the synchronization of the drive signal and the output signal from the sense lines of the touch sensor panel can be achieved using different methods including those described in the following paragraphs.

In one embodiment, the stylus can be physically connected to the touch sensing device by a cable. The connection can be made using an existing port on the touch sensing device, such as an audio jack or a 30-pin jack. In a second embodiment, the stylus can be synchronized with the touch sensing device via wireless channels such as WiFi and BlueTooth. In both embodiments the drive signal can be synchronized with the output signal via the physical channel or the wireless channel, respectively.

Figure 6:
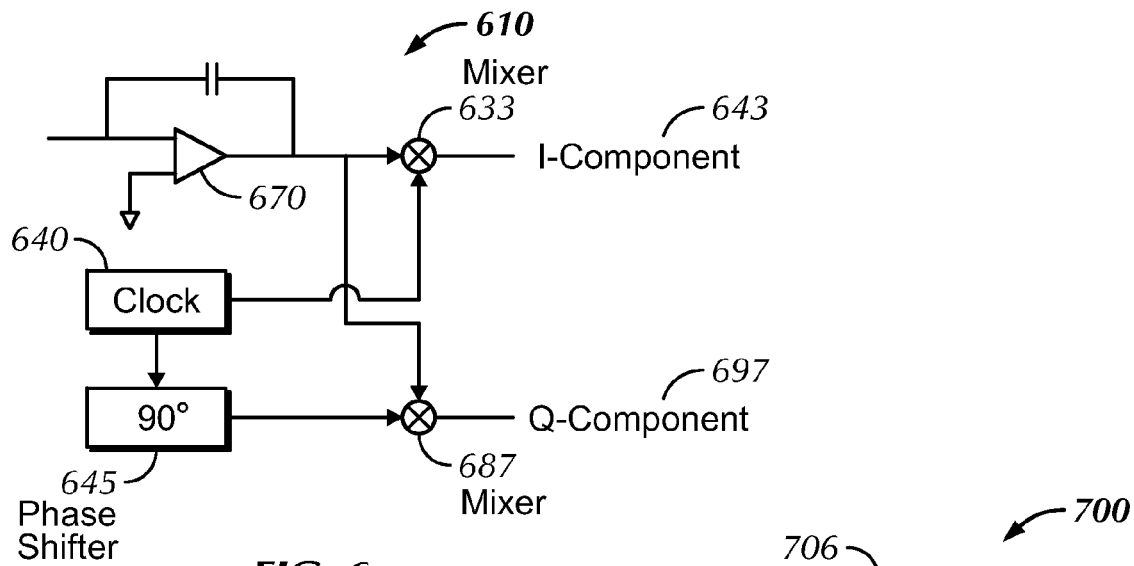
FIG. 6 illustrates exemplary sense circuitry of the touch sensor panel of FIG. 4 according to various embodiments.

In a third embodiment, in-phase/quadrature (IQ) demodulation at the sensor can be performed to circumvent the synchronization issue in a touch sensitive system where the stylus can act as a drive electrode. FIG. 6 illustrates exemplary sense circuitry 610. The sense circuitry 610 can sense a capacitance from conductive elements of a touch sensor panel that are capacitively coupled to the stylus. The stylus sensing circuitry 610 can include amplifier 670 to receive the capacitance reading from the panel, clock 640 to generate a demodulation signal, phase shifter 645 to generate a phase-shifted demodulation signal, mixer 633 to demodulate the capacitance reading with an in-phase demodulation frequency component, and mixer 687 to demodulate the capacitance reading with a quadrature demodulation frequency component. The demodulated results (i.e., the in-phase component 643 and the quadrature component 697) can then be used to determine an amplitude proportional to the capacitance. Essentially, IQ demodulation can eliminate the need to phase-synchronize the drive signal from the stylus and the output signal from the touch sensor panel. However, frequency matching may still be required in this embodiment so that the stylus can be driving at the same frequency at which the touch sensor panel is listening.

In the above-disclosed embodiments, the stylus can act as a drive electrode in the touch sensing system. The following embodiments disclose touch sensing systems where the stylus can act as a sensing electrode. In particular, the stylus can act as a sensing element capacitively coupled with a proximate conductive row or column of a touch sensor panel that has been stimulated by a stimulation signal. The stylus can then output signals representative of the charge coupling to sensing circuitry.

Figure 7:
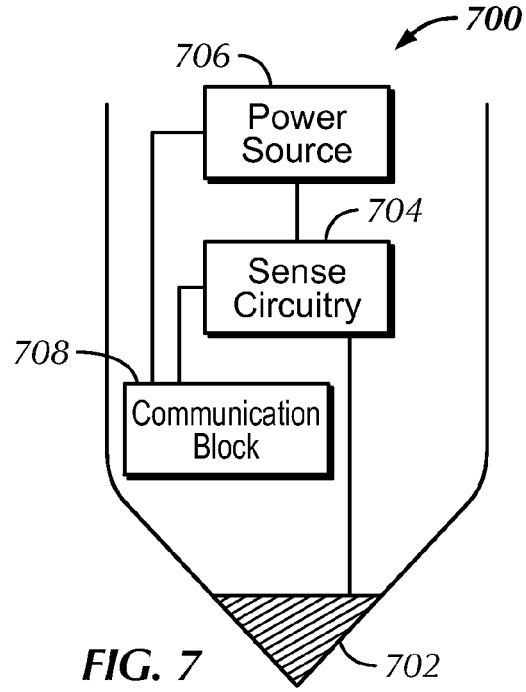
FIG. 7 illustrates another exemplary active stylus for use with a capacitive touch sensor panel according to various embodiments.

FIG. 7 illustrates an exemplary active stylus 700 as a sense electrode. The stylus 700 can house sense circuitry 704 connected to an electrode 702 at the distal end of the stylus. The sense circuitry 704 can sense the capacitive coupling between the electrode 702 and the drive lines of a capacitive touch sensor panel.

Figure 8:
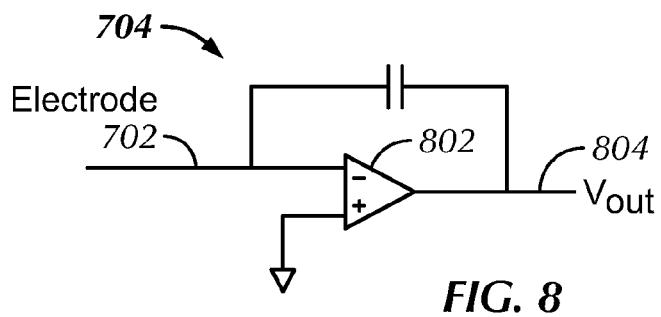
FIG. 8 illustrates exemplary sense circuitry of the active stylus of FIG. 7 according to various embodiments.

The sense circuitry 704 can be similar to those found in existing capacitive touch sensor panels. FIG. 8 illustrates exemplary sense circuitry 704 of the stylus 700 according to various embodiments. The stylus sense circuitry 704 can include amplifier 802 to receive an input signal indicative of the capacitance reading from the electrode 702 and produce an output signal 804. Additionally, the sense circuitry 704 can be connected to a power source 706, such as a battery, built in the stylus. In another embodiment, power can be supplied from a power source in another electronic device, such as a touch sensing device, via a cable connecting the stylus to the device, or via inductive coupling. In another embodiment, the stylus can include the sense circuitry 610 illustrated in FIG. 6. In yet another embodiment, the stylus can include multiple sense electrodes connected to one or more sense circuits.

The stylus acting as a sense electrode (e.g., the stylus 700 of FIG. 7) can generally work in the opposite way that a stylus acting as a drive electrode (e.g., the stylus 200 of FIG. 2) works. In particular, a capacitive touch sensor panel can receive and emanate stimulus signals which can induce a charge coupling onto the stylus that is detectable by the stylus when the stylus is in contact with (or hovering above) the touch sensor panel.

Figure 9:
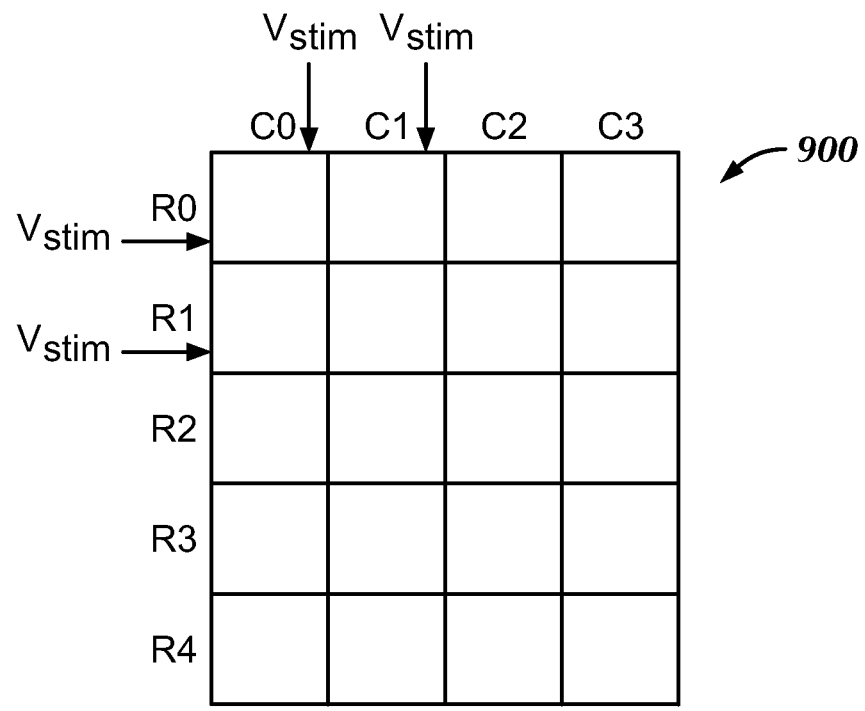
FIG. 9 illustrates the structure of another exemplary touch sensor panel according to various embodiments.

FIG. 9 illustrates an exemplary capacitive touch sensor panel 900 designed for interacting with a stylus acting as a sense electrode. As illustrated, the capacitive touch sensor panel 900 can include both drive rows (R0-R4) and drive columns (C0-C3). Although five rows and four columns are illustrated in FIG. 9, it should be understood that different number of drive rows and drive columns can be built based on, for example, the size of the touch sensor panel and the desired touch resolution of the touch sensor panel. The drive rows and columns can be similar to the drive lines found in existing capacitive touch sensor panels. The drive rows and columns can be conductive. Each of the drive rows and columns can capacitive couple with the electrode in the stylus. The drive rows and columns can be formed on the same surface of a substrate, on the opposite surfaces of a substrate, or on the surfaces of two different substrates. In some embodiments, the touch sensor panel 900 can also include sense columns or rows as an existing capacitive touch sensor panel so as to allow the touch sensor panel to detect other objects and retain other functionalities of an existing capacitive touch sensor panel.

Figure 10:
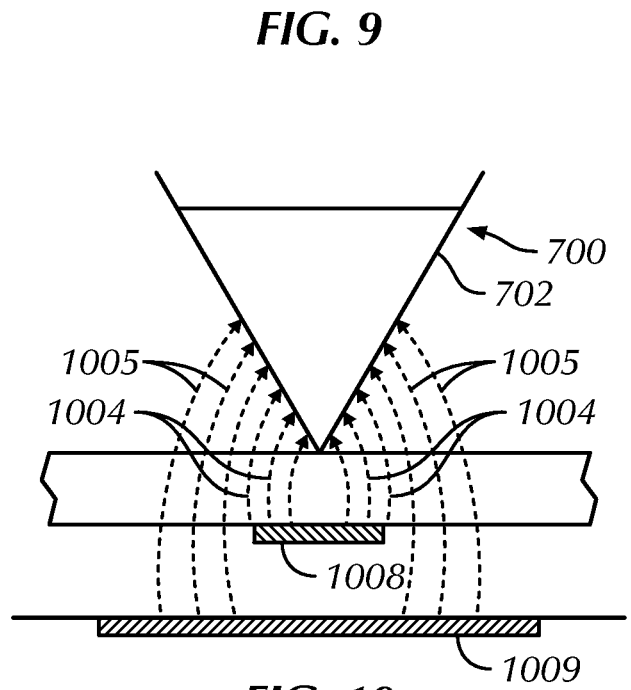
FIG. 10 illustrates the interaction between the active stylus of FIG. 7 with the touch sensor panel of FIG. 9 according to various embodiments.

FIG. 10 illustrates an exemplary coupling of the active stylus of FIG. 7 and the capacitive touch sensor panel of FIG. 9. As illustrated, when the stylus tip is in contact with (or in close proximity to) the capacitive touch sensor panel 900, capacitive coupling, as indicated by the electric field lines (collectively 1004), can be formed between a stimulated drive column 1008 and the electrode 702 in the tip. Additionally and alternatively, capacitive coupling, as indicated by other electric field lines (collectively 1005), can be formed between a stimulated drive row 1009 and the electrode 702. In some embodiments, the stimulus signal from each drive row and column can be coded differently. This can allow the sense circuitry 704 in the stylus to identify the drive row or column with which the electrode 702 in the stylus has capacitively coupled. Based on the identified row(s) and column(s), the location of the stylus touch can be determined.

The touch data captured by the sense circuitry 704 can be processed by a processor in the stylus and/or transmitted back to the touch sensor panel for further processing. In some embodiments, the information can be sent via a cable connecting the stylus to the touch sensor panel or a wireless channel such as WiFi and BlueTooth. In other embodiments, the information can be encoded in a pulse signal transmitted from the stylus to the touch sensor panel, as disclosed in the previously-mentioned application (application Ser. No. 13/166,699) which is incorporated by reference herein in its entirety for all purposes. These communication embodiments can be collectively represented in FIG. 7 as communications block 708.

In other embodiments, the styluses acting as a sense electrode in a touch sensing system can incorporate one or more features disclosed in the other previously-mentioned applications (application Ser. Nos. 13/166,711 and 13/166,743) which are also incorporated by reference herein in their entirety for all purposes.

In one embodiment, an active stylus can house both driving and sensing circuitry and can include a switching mechanism coupled between the two circuits for switching between driving and sensing according to the requirements of the system in which the stylus is used. In another embodiment, the touch sensor panel can drive a first axis (either column or row) and the stylus can listen on that first axis. At the same time, the stylus can drive a second axis and the touch sensor panel can listen on that second axis. The touch data captured by the touch sensor panel and the stylus can be combined to determine touch locations and other touch-related data.

The active styluses disclosed in the embodiments above can significantly improve stylus-sensing in a touch sensing system. Because these styluses can include electrodes that are designed to actively capacitive couple with the drive and/or sense lines of a touch sensor panel instead of blocking electric field lines on the touch sensor panel, they can have smaller tips, which can make touch sensing more precise. In addition, on touch sensor panels capable of determining the area of each touch detected on its surface, the active styluses can be distinguished from other touch objects based on their smaller touch area.

Additionally, if the tip of the styluses is small, software compensation can correct "wobbles" in the touch path. These "wobbles" can be created when the touch path passes through spots on the touch sensor panel not directly over or in close proximity to any sense line. Because of the weak capacitive coupling at those spots, the touch locations captured by the touch sensor panel can be inaccurate. Existing finger-operated touch sensor panel may use software algorithms to correct those "wobbles" in a touch path. However, because different user can have fingers of different sizes, a universal compensation algorithm may not work well with touches from different fingers. In comparison, the active styluses from the embodiments disclosed above can have a known point source. Thus, a software compensation algorithm can be optimized to work with touches by the stylus to better reduce the "wobbles" in a touch path.

Although some embodiments are described herein in terms of a stylus, it is to be understood that other input devices and/or pointing devices can be used according to various embodiments.

Although some embodiments are described herein in terms of a touch sensor panel, it is to be understood that other touch sensitive devices capable of sensing an object touching or hovering over the devices can be used according to various embodiments.

Figure 11:
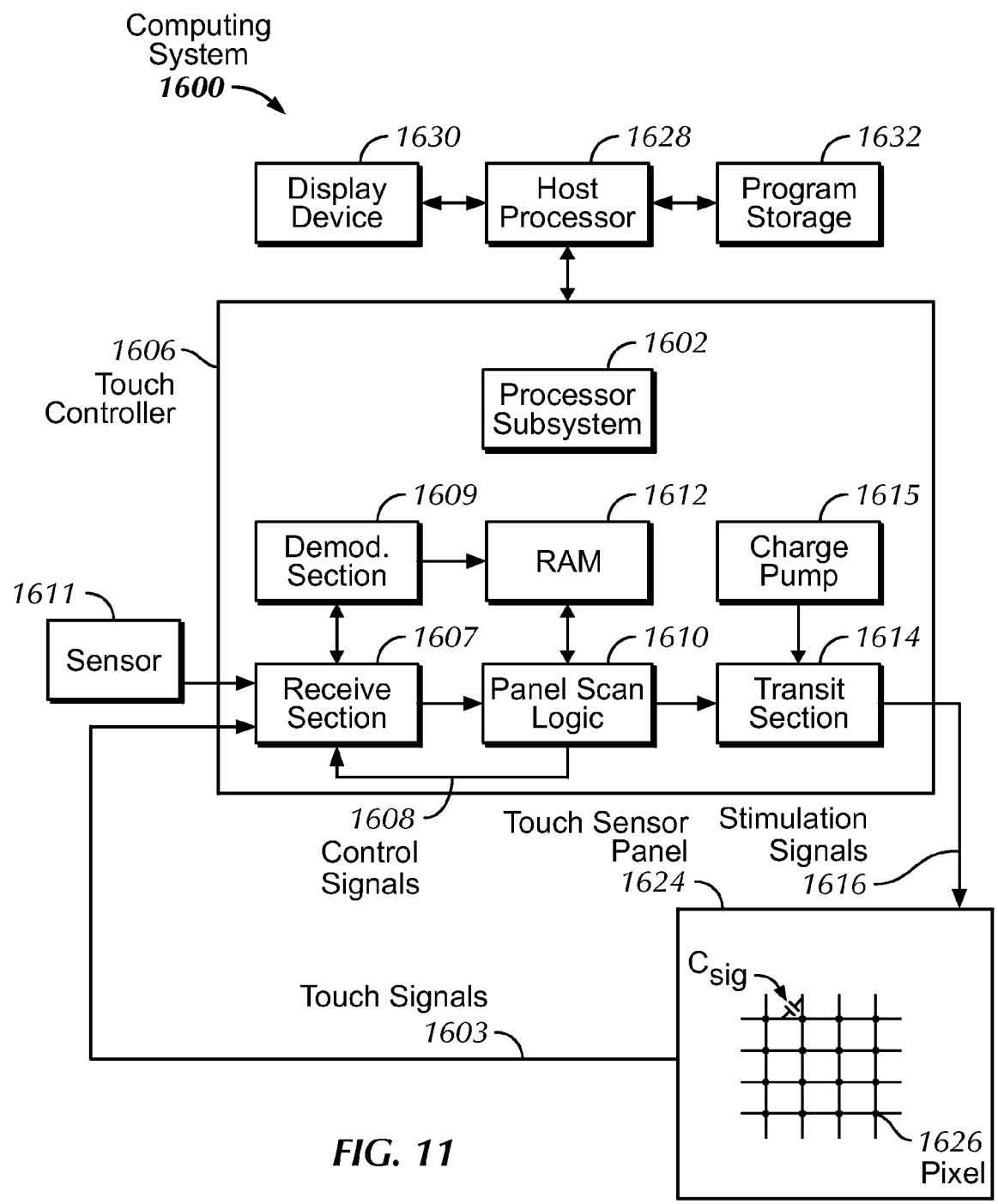
FIG. 11 illustrates an exemplary computing system for use with a stylus according to various embodiments.

FIG. 11 illustrates an exemplary computing system that can use a stylus according to various embodiments. In the example of FIG. 11, computing system 1600 can include touch controller 1606. The touch controller 1606 can be a single application specific integrated circuit (ASIC) that can include one or more processor subsystems 1602, which can include one or more main processors, such as ARM968 processors or other processors with similar functionality and capabilities. However, in other embodiments, the processor functionality can be implemented instead by dedicated logic, such as a state machine. The processor subsystems 1602 can also include peripherals (not shown) such as random access memory (RAM) or other types of memory or storage, watchdog timers and the like. The touch controller 1606 can also include receive section 1607 for receiving signals, such as touch (or sense) signals 1603 of one or more sense channels (not shown), other signals from other sensors such as sensor 1611, etc. The touch controller 1606 can also include demodulation section 1609 such as a multistage vector demodulation engine, panel scan logic 1610, and transmit section 1614 for transmitting stimulation signals 1616 to touch sensor panel 1624 to drive the panel. The scan logic 1610 can access RAM 1612, autonomously read data from the sense channels, and provide control for the sense channels. In addition, the scan logic 1610 can control the transmit section 1614 to generate the stimulation signals 1616 at various frequencies and phases that can be selectively applied to rows of the touch sensor panel 1624.

The touch controller 1606 can also include charge pump 1615, which can be used to generate the supply voltage for the transmit section 1614. The stimulation signals 1616 can have amplitudes higher than the maximum voltage by cascading two charge store devices, e.g., capacitors, together to form the charge pump 1615. Therefore, the stimulus voltage can be higher (e.g., 6V) than the voltage level a single capacitor can handle (e.g., 3.6 V). Although FIG. 11 shows the charge pump 1615 separate from the transmit section 1614, the charge pump can be part of the transmit section.

Computing system 1600 can include host processor 1628 for receiving outputs from the processor subsystems 1602 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 1628 can also perform additional functions that may not be related to touch processing, and can be connected to program storage 1632 and display device 1630 such as an LCD for providing a UI to a user of the device. Display device 1630 together with touch sensor panel 1624, when located partially or entirely under the touch sensor panel, can form a touch screen.

Touch sensor panel 1624 can include a capacitive sensing medium having drive lines and sense lines. It should be noted that the term "lines" can sometimes be used herein to mean simply conductive pathways, as one skilled in the art can readily understand, and is not limited to structures that can be strictly linear, but can include pathways that change direction, and can include pathways of different size, shape, materials, etc. Drive lines can be driven by stimulation signals 1616 and resulting touch signals 1603 generated in sense lines can be transmitted to receive section 1607 in touch controller 1606. In this way, drive lines and sense lines can be part of the touch and hover sensing circuitry that can interact to form capacitive sensing nodes, which can be thought of as touch picture elements (touch pixels), such as touch pixels 1626. This way of understanding can be particularly useful when touch sensor panel 1624 can be viewed as capturing an "image" of touch. In other words, after touch controller 1606 has determined whether a touch or hover has been detected at each touch pixel in the touch sensor panel, the pattern of touch pixels in the touch sensor panel at which a touch or hover occurred can be thought of as an "image" of touch (e.g. a pattern of fingers touching or hovering over the touch sensor panel).

A stylus according to various embodiments can be used to contact the touch sensor panel 1624. The stylus orientation can provide additional information to the computing system 1600 for improved performance.

Note that one or more of the functions described above, can be performed, for example, by firmware stored in memory (e.g., one of the peripherals) and executed by the processor subsystem 1602, or stored in program storage 1632 and executed by the host processor 1628. The firmware can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the touch sensor panel, as described in FIG. 11, can sense touch and hover according to various embodiments. In addition, the touch sensor panel described herein can be either single- or multi-touch.

Figure 12:
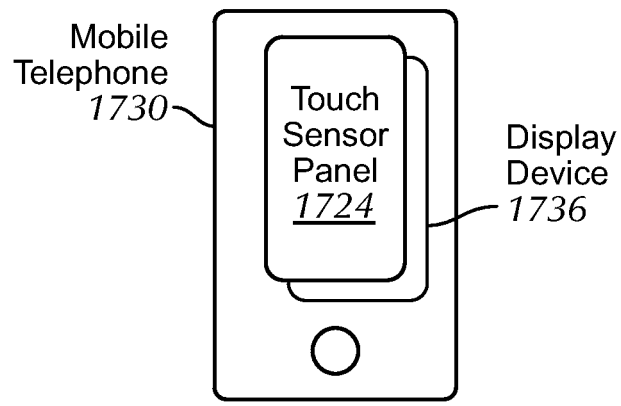
FIG. 12 illustrates an exemplary mobile telephone for use with a stylus according to various embodiments.

FIG. 12 illustrates an exemplary mobile telephone 1730 that can include touch sensor panel 1724, display device 1736, and other computing system blocks for use with a stylus according to various embodiments.

Figure 13:
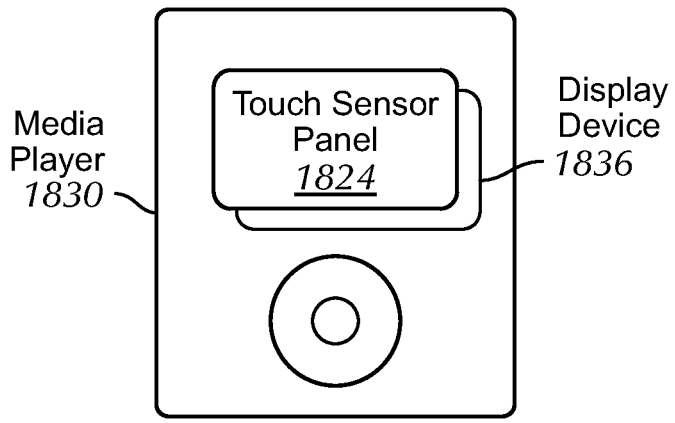
FIG. 13 illustrates an exemplary digital media player for use with a stylus according to various embodiments.

FIG. 13 illustrates an exemplary digital media player 1830 that can include touch sensor panel 1824, display device 1836, and other computing system blocks for use with a stylus according to various embodiments.

Figure 14:
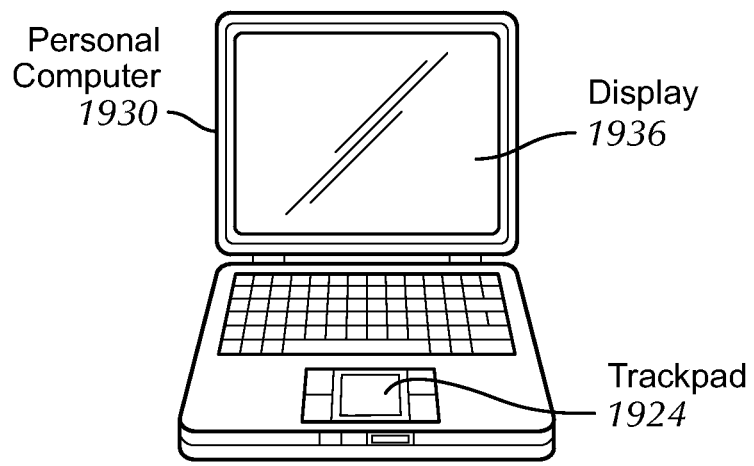
FIG. 14 illustrates an exemplary personal computer for use with a stylus according to various embodiments.

FIG. 14 illustrates an exemplary personal computer 1930 that can include touch pad 1924, display 1936, and other computing system blocks for use with a stylus according to various embodiments.

The mobile telephone, media player, and personal computer of FIGS. 12 through 14 can improve touch and hover sensing and preserve power by utilizing a stylus according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. An active stylus, comprising:
an electrode at a tip of the stylus;
powered circuitry coupled to the electrode and configured to capacitively couple the electrode with a capacitive touch sensor panel, the powered circuitry comprising:
a clock to generate a drive voltage;
a microcontroller connected to the clock and configured to control the drive voltage; and
an amplifier connected to the microcontroller and configured to adjust the drive voltage and output the drive voltage at the electrode; and
a wireless transceiver configured to synchronize the active stylus and the capacitive touch sensor panel.

2. The active stylus of claim 1, further comprising a power source coupled to the powered circuitry for supplying power to the powered circuitry.

3. The active stylus of claim 1, wherein the electrode is stimulated at a frequency to identify the presence of the stylus.

4. The active stylus of claim 1, wherein the electrode is stimulated with a pattern that identifies a presence of the stylus.

5. The active stylus of claim 1, wherein the wireless transceiver synchronizes the active stylus and the capacitive touch sensor panel via a WiFi or BlueTooth wireless channel.

6. The active stylus of claim 1, further comprising a plurality of electrodes.

7. The active stylus of claim 1, further comprising one or more sensors including one or more of a pressure sensor, a motion sensor, an orientation sensor, an accelerometer, a touch sensor and a rotation sensor.

8. The active stylus of claim 7, wherein the drive voltage is encoded with information from the one or more sensors to transmit to a host device.

9. The active stylus of claim 1, the active stylus incorporated into a touch-based input system, the system comprising:
the capacitive touch sensor panel, wherein the capacitive touch sensor panel includes:
a plurality of sense lines; and
one or more sense channels coupled to the plurality of sense lines, the one or more sense channels configured to detect a change in capacitance between the electrode of the active stylus and one or more sense lines to determine a location of a touch by the active stylus on the capacitive touch sensor panel.

10. The active stylus of claim 9, wherein the one or more sense channels comprise at least one row channel and at least one column channel.

11. The active stylus of claim 9, wherein the one or more sense channels comprise:
a sense amplifier to adjust a detected change in capacitive coupling;
a clock to generate a demodulation signal;
a phase shifter to shift a phase of the demodulation signal; and
a set of mixers to receive the detected change in capacitive coupling and either the demodulation signal or the phase-shifted demodulation signal to demodulate a sensed voltage indicative of the change in capacitance.

12. The active stylus of claim 11, wherein the mixer receiving the demodulation signal produces an in-phase component;

wherein the mixer receiving the phase-shifted demodulation signal produces a quadrature component; and wherein the in-phase component and the quadrature component are combined to determine an amplitude proportional to a capacitance formed by one or more drive channels coupled to one or more drive lines of the capacitive touch sensor panel and the one or more sense channels.

13. The active stylus of claim 11, wherein the clock is capable of generating a demodulation signal with a frequency equal to a frequency of the drive voltage of the active stylus.

14. The active stylus of claim 11, wherein the capacitive touch sensor panel includes at least one drive line capable of being stimulated by a signal when the capacitive touch sensor panel is not detecting the change in capacitance between the electrode of the active stylus and the one or more sense lines.

15. The active stylus of claim 9, wherein the capacitive touch sensor panel further comprises at least one drive line configured to generate a signal that can be sensed by at least one of the sense channels.

16. The active stylus of claim 15, wherein the at least one drive line is capable of generating a signal with a frequency different than the drive voltage of the active stylus.

17. The active stylus of claim 1, wherein synchronizing the active stylus and the capacitive touch sensor panel enables synchronous demodulation of one or more signals received at the capacitive touch sensor panel.

18. A method for stimulating a capacitive touch sensor panel of a touch sensing device with an active stylus, comprising:

generating a clock signal at the stylus;

controlling the clock signal with a microcontroller to generate a drive signal;

amplifying the drive signal to generate a stimulation signal;

applying the stimulation signal at a powered electrode of the stylus;

capacitively coupling the powered electrode with the capacitive touch sensor panel by forming a mutual capacitance between the powered electrode and the touch sensor panel; and synchronizing, with a wireless transceiver of the active stylus, the active stylus and the capacitive touch sensor panel.

19. The method of claim 18, wherein the stimulation signal generated at the powered electrode has a first frequency different than a second frequency used to by the touch sensing device to stimulate drive lines of the capacitive touch sensor panel.

20. The method of claim 18, wherein the wireless transceiver synchronizes the active stylus and the capacitive touch sensor panel via a WiFi or BlueTooth wireless channel.

21. The method of claim 18, wherein synchronizing the active stylus and the capacitive touch sensor panel enables synchronous demodulation of one or more signals received at the capacitive touch sensor panel.

* * * * *